US010515405B2

(12) United States Patent
Sorbe

(10) Patent No.: US 10,515,405 B2
(45) Date of Patent: Dec. 24, 2019

(54) PERSON-TO-PERSON LENDING PROGRAM PRODUCT, SYSTEM, AND ASSOCIATED COMPUTER-IMPLEMENTED METHODS

(75) Inventor: Trent Sorbe, Brookings, SD (US)

(73) Assignee: METABANK, Sioux Falls, SD (US)

( * ) Notice: Subject to any disclaimer, the term of this patent is extended or adjusted under 35 U.S.C. 154(b) by 1595 days.

(21) Appl. No.: 12/397,113

(22) Filed: Mar. 3, 2009

(65) Prior Publication Data

US 2009/0228307 A1    Sep. 10, 2009

Related U.S. Application Data

(60) Provisional application No. 61/033,069, filed on Mar. 3, 2008.

(51) Int. Cl.
*G06Q 40/00* (2012.01)
*G06Q 40/02* (2012.01)
*G06Q 40/08* (2012.01)

(52) U.S. Cl.
CPC ........... *G06Q 40/00* (2013.01); *G06Q 40/025* (2013.01); *G06Q 40/08* (2013.01)

(58) Field of Classification Search
CPC ...................................................... G06Q 40/00
USPC ..................................................... 705/35–45
See application file for complete search history.

(56) References Cited

U.S. PATENT DOCUMENTS

| | | |
|---|---|---|
| 3,752,904 A | 8/1973 | Waterbury |
| 4,247,759 A | 1/1981 | Yuris et al. |
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |

(Continued)

FOREIGN PATENT DOCUMENTS

| | | |
|---|---|---|
| EP | 0397512 A2 | 11/1990 |
| EP | 0619565 A1 | 10/1994 |

(Continued)

OTHER PUBLICATIONS

The Smart Student Guide to Financial Aid, Zopa USA Peer to Peer Loans, 2 pages, (Year: 2005).*

(Continued)

*Primary Examiner* — Bruce I Ebersman
(74) *Attorney, Agent, or Firm* — Bracewell LLP

(57) ABSTRACT

An individual consumer borrower accessing a person-to-person lending website is provided an opportunity to have a loan request wholly or partially satisfied by a financial institution at loan terms from the financial institution. The financial institution, for example, can receive information about a person-to-person loan request, determine whether to authorize a financial institutional loan, offer a loan to the individual on terms determined by the financial institution, and issue the loan to an individual consumer borrower responsive to approval of the terms. Prior to an auction, the individual consumer can choose an immediate loan offer having financial institution terms or choose to solicit individual consumer loan offers with more favorable terms through the person-to-person lending website. The financial institution can also offer a gap filling loan for a deficiency amount so that the loan request can be partially satisfied by individual consumer loan offers.

11 Claims, 8 Drawing Sheets

(56) References Cited

U.S. PATENT DOCUMENTS

| | | |
|---|---|---|
| 4,577,061 A | 3/1986 | Katzaff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,151,582 A | 9/1992 | Fujioka |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanärä et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Wanatabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,513,117 A | 4/1996 | Small |
| 5,531,482 A | 7/1996 | Blank |
| 5,511,114 A | 8/1996 | Stimson et al. |
| 5,550,358 A | 8/1996 | Tait et al. |
| 5,577,109 A | 11/1996 | Stimson et al. |
| 5,577,112 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,724,575 A | 3/1998 | Hoover et al. |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,940,812 A | 8/1999 | Tengel et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlbergar et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziamo |
| 6,304,860 B1 | 10/2001 | Martin et al. |
| 6,315,193 B1 | 11/2001 | Hogan |
| 6,330,544 B1 | 12/2001 | Walker et al. |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,793,131 B2 | 9/2004 | Hogan |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson et al. |
| 7,206,761 B2 | 4/2007 | Colvin |
| 7,252,223 B2 | 8/2007 | Schofield |
| 7,258,273 B2 | 8/2007 | Griffin |
| 7,363,265 B2 | 4/2008 | Horgan |
| 7,370,076 B2 | 5/2008 | Friedman et al. |
| 7,392,224 B1 | 6/2008 | Bauer et al. |
| 7,398,919 B2 | 7/2008 | Cooper |
| 7,421,410 B1 | 9/2008 | Schechtman et al. |
| 7,426,492 B1 | 9/2008 | Bishop et al. |
| 7,472,089 B2 | 12/2008 | Hu et al. |
| 7,493,279 B1 | 2/2009 | Kwan |
| 7,509,286 B1 | 3/2009 | Bent et al. |
| 7,541,920 B2 | 6/2009 | Tambascio et al. |
| 7,546,945 B1 | 6/2009 | Bucci et al. |
| 7,567,936 B1 | 7/2009 | Peckover et al. |
| 7,584,887 B1 | 9/2009 | Sanchez et al. |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,645,194 B2 * | 1/2010 | Van Luchene .......... G07F 17/32 463/25 |
| 7,653,591 B1 | 1/2010 | Dabney |
| 7,702,583 B1 | 4/2010 | Hamilton et al. |
| 7,702,587 B2 | 4/2010 | Nguyen et al. |
| 7,752,102 B2 | 7/2010 | Thomas |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,856,399 B2 | 12/2010 | Wilkes |
| 7,865,434 B2 | 1/2011 | Sheets |
| 7,873,569 B1 * | 1/2011 | Cahn ............................... 705/38 |
| 7,899,750 B1 | 3/2011 | Klieman et al. |
| 7,904,333 B1 | 3/2011 | Perkowski |
| 7,933,833 B2 | 4/2011 | Hotz et al. |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,069,435 B1 | 11/2011 | Lai |
| 8,086,494 B2 | 12/2011 | Dooley et al. |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |

(56) References Cited

U.S. PATENT DOCUMENTS

| | | |
|---|---|---|
| 8,108,977 B1 | 2/2012 | Miller |
| 8,150,764 B2 | 4/2012 | Crowe et al. |
| 8,175,962 B2 | 5/2012 | Galit et al. |
| 8,175,972 B2 | 5/2012 | Galit et al. |
| 8,190,480 B1 | 5/2012 | Ahlers et al. |
| 8,214,286 B1 | 7/2012 | Galit et al. |
| 8,244,611 B2 | 8/2012 | Galit |
| 8,244,637 B2 | 8/2012 | Galit et al. |
| 8,260,678 B2 | 9/2012 | Miller |
| 8,266,047 B2 | 9/2012 | Galit |
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,380,623 B1 * | 2/2013 | Ley et al. ............. 705/39 |
| 8,386,375 B2 | 2/2013 | Galit |
| 8,392,299 B2 | 3/2013 | Sorbe et al. |
| 8,392,330 B2 | 3/2013 | Sorbe et al. |
| 8,396,754 B2 | 3/2013 | Dooley et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,583,515 B2 | 11/2013 | Sorbe et al. |
| 8,583,549 B1 | 11/2013 | Mohsenzadeh |
| 8,589,295 B2 | 11/2013 | Sorbe et al. |
| 8,602,297 B2 | 12/2013 | Wilen |
| 8,635,131 B1 | 1/2014 | Saunders |
| 8,636,203 B1 | 1/2014 | Patterson et al. |
| 8,725,644 B2 | 5/2014 | Schlesser et al. |
| 9,875,491 B2 * | 1/2018 | Weksler ............. G06Q 30/06 |
| 2001/0013542 A1 | 8/2001 | Horowitz et al. |
| 2001/0021925 A1 | 9/2001 | Ukigawa et al. |
| 2001/0032251 A1 | 10/2001 | Rhoads et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2001/0051900 A1 | 12/2001 | Fisher et al. |
| 2002/0002075 A1 | 1/2002 | Rowe |
| 2002/0032612 A1 | 3/2002 | Williams et al. |
| 2002/0038285 A1 * | 3/2002 | Golden ............. G06Q 30/08 705/38 |
| 2002/0042744 A1 | 4/2002 | Kohl |
| 2002/0055904 A1 | 5/2002 | Mon |
| 2002/0055909 A1 | 5/2002 | Fung et al. |
| 2002/0072942 A1 | 6/2002 | Kuykendall et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0133445 A1 | 9/2002 | Lessin |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1 | 1/2003 | Risafi et al. |
| 2003/0004997 A1 | 1/2003 | Parker et al. |
| 2003/0017865 A1 | 1/2003 | Beaulieu et al. |
| 2003/0018568 A1 * | 1/2003 | Chen ............. 705/37 |
| 2003/0053609 A1 | 3/2003 | Risafi et al. |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0120553 A1 | 6/2003 | Williams |
| 2003/0135459 A1 | 7/2003 | Abelman et al. |
| 2003/0144935 A1 | 7/2003 | Sobek |
| 2003/0150142 A1 | 8/2003 | Street |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0122736 A1 | 6/2004 | Strock et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0158522 A1 | 8/2004 | Brown et al. |
| 2004/0167821 A1 | 8/2004 | Baumgartner |
| 2004/0181481 A1 | 9/2004 | Carter |
| 2004/0188221 A1 | 9/2004 | Carter |
| 2004/0199463 A1 | 10/2004 | Deggendorf |
| 2004/0205138 A1 | 10/2004 | Friedman et al. |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2004/0249752 A1 | 12/2004 | Prato et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0049974 A1 | 3/2005 | Jani et al. |
| 2005/0060257 A1 | 3/2005 | Fry |
| 2005/0071230 A1 | 3/2005 | Mankoff |
| 2005/0075939 A1 | 4/2005 | Bao et al. |
| 2005/0077350 A1 | 4/2005 | Courtion et al. |
| 2005/0082364 A1 | 4/2005 | Alvarez et al. |
| 2005/0108121 A1 | 5/2005 | Gravett et al. |
| 2005/0108164 A1 | 5/2005 | Salafia, III et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Allgiene |
| 2005/0211765 A1 | 9/2005 | Brown et al. |
| 2005/0228724 A1 | 10/2005 | Frangiosa |
| 2005/0247798 A1 | 11/2005 | Graves et al. |
| 2005/0273430 A1 | 12/2005 | Pliha |
| 2005/0274798 A1 | 12/2005 | Bacastow |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0054682 A1 | 3/2006 | De La Huerga |
| 2006/0059085 A1 | 3/2006 | Tucker |
| 2006/0074804 A1 | 4/2006 | Cinar |
| 2006/0085269 A1 | 4/2006 | Guilfoyle |
| 2006/0085334 A1 | 4/2006 | Murphy |
| 2006/0100914 A1 | 5/2006 | Jafri et al. |
| 2006/0113376 A1 | 6/2006 | Reed et al. |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0210753 A1 | 9/2006 | Kadlec |
| 2006/0212392 A1 | 9/2006 | Brown |
| 2006/0212393 A1 | 9/2006 | Brown |
| 2006/0224502 A1 * | 10/2006 | McGowan ............. 705/38 |
| 2006/0247975 A1 | 11/2006 | Shapiro et al. |
| 2006/0249570 A1 | 11/2006 | Seifert et al. |
| 2006/0249870 A1 | 11/2006 | Tachauer |
| 2006/0259364 A1 | 11/2006 | Strock et al. |
| 2006/0259957 A1 | 11/2006 | Tam et al. |
| 2006/0282356 A1 | 12/2006 | Andres et al. |

(56) References Cited

U.S. PATENT DOCUMENTS

| | | |
|---|---|---|
| 2006/0282374 A1 | 12/2006 | Stone |
| 2006/0293947 A1 | 12/2006 | Nicholson |
| 2006/0293966 A1 | 12/2006 | Inouye |
| 2007/0000997 A1 | 1/2007 | Lambert et al. |
| 2007/0005416 A1 | 1/2007 | Jackson et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0061248 A1* | 3/2007 | Shavit .................. G06Q 40/00 705/37 |
| 2007/0075134 A1 | 4/2007 | Perlow et al. |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0100748 A1 | 5/2007 | Dheer et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Knandaker et al. |
| 2007/0192237 A1* | 8/2007 | Duoos .................. G06Q 40/025 705/38 |
| 2007/0194113 A1 | 8/2007 | Esplin et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0215699 A1 | 9/2007 | Arego et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0252010 A1 | 11/2007 | Gonzalez et al. |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2007/0288354 A1 | 12/2007 | Leclair et al. |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0052224 A1 | 2/2008 | Parker |
| 2008/0059306 A1 | 3/2008 | Fordyce et al. |
| 2008/0059363 A1 | 3/2008 | Hotz et al. |
| 2008/0065532 A1 | 3/2008 | De La Motte |
| 2008/0082418 A1 | 4/2008 | Fordyce et al. |
| 2008/0091519 A1 | 4/2008 | Foss |
| 2008/0103627 A1 | 5/2008 | Torian |
| 2008/0103968 A1 | 5/2008 | Bies et al. |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0140576 A1 | 6/2008 | Lewis et al. |
| 2008/0154702 A1 | 6/2008 | Pleban |
| 2008/0162271 A1 | 7/2008 | Benjamin |
| 2008/0162337 A1 | 7/2008 | Greenland et al. |
| 2008/0195541 A1 | 8/2008 | Battaglini et al. |
| 2008/0197192 A1 | 8/2008 | Lindahl et al. |
| 2008/0210753 A1 | 9/2008 | Plozay et al. |
| 2008/0228582 A1 | 9/2008 | Fordyce et al. |
| 2008/0228643 A1 | 9/2008 | Hall |
| 2008/0235095 A1 | 9/2008 | Oles et al. |
| 2008/0270163 A1 | 10/2008 | Green |
| 2008/0270298 A1 | 10/2008 | McElroy et al. |
| 2008/0270304 A1 | 10/2008 | Brown et al. |
| 2008/0281692 A1* | 11/2008 | Zhang .................. G06Q 20/10 705/14.16 |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2008/0314996 A1 | 12/2008 | Smith |
| 2008/0319868 A1 | 12/2008 | Briscoe et al. |
| 2009/0006203 A1 | 1/2009 | Fordyce, III et al. |
| 2009/0048923 A1 | 2/2009 | Seven et al. |
| 2009/0048963 A1 | 2/2009 | Bishop et al. |
| 2009/0061929 A1 | 3/2009 | Evans |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0078757 A1 | 3/2009 | Hanson et al. |
| 2009/0089205 A1 | 4/2009 | Bayne |
| 2009/0094125 A1 | 4/2009 | Killian et al. |
| 2009/0099964 A1 | 4/2009 | Calderon-Gonzalez |
| 2009/0112761 A1 | 4/2009 | Robertson et al. |
| 2009/0134218 A1 | 5/2009 | Yuzon et al. |
| 2009/0138396 A1 | 5/2009 | Boal |
| 2009/0157220 A1 | 6/2009 | Walker et al. |
| 2009/0164351 A1 | 6/2009 | Sorbe et al. |
| 2009/0164362 A1 | 6/2009 | Moore |
| 2009/0164363 A1 | 6/2009 | Ahlers |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2009/0254484 A1 | 10/2009 | Forero et al. |
| 2009/0265241 A1 | 10/2009 | Bishop et al. |
| 2010/0012721 A1 | 1/2010 | Jain et al. |
| 2010/0017278 A1 | 1/2010 | Wilen et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076836 A1 | 3/2010 | Giordano et al. |
| 2010/0076875 A1 | 3/2010 | Ernst et al. |
| 2010/0106555 A1 | 4/2010 | Mneimneh et al. |
| 2010/0114743 A1* | 5/2010 | Misraje ................ G06Q 10/101 705/35 |
| 2010/0123006 A1 | 5/2010 | Chen |
| 2010/0153273 A1 | 6/2010 | Sellars et al. |
| 2010/0174584 A1 | 7/2010 | Tiezten et al. |
| 2010/0222132 A1 | 9/2010 | Sanford et al. |
| 2010/0280921 A1 | 11/2010 | Stone et al. |
| 2010/0280949 A1 | 11/2010 | Van Rensburg |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0054981 A1 | 3/2011 | Faith et al. |
| 2011/0082737 A1 | 4/2011 | Crowe et al. |
| 2011/0093323 A1 | 4/2011 | Prus et al. |
| 2011/0106698 A1 | 5/2011 | Isaacson et al. |
| 2011/0112956 A1 | 5/2011 | Ling et al. |
| 2011/0112957 A1 | 5/2011 | Ingram et al. |
| 2011/0124390 A1 | 5/2011 | Wilen |
| 2011/0153462 A1 | 6/2011 | Granich |
| 2011/0270664 A1 | 11/2011 | Jones |
| 2011/0282784 A1 | 11/2011 | Nelsen |
| 2012/0047003 A1 | 2/2012 | Hammad et al. |
| 2012/0095820 A1 | 4/2012 | Chandrasekaram et al. |
| 2012/0123827 A1 | 5/2012 | Dooley et al. |
| 2012/0271697 A1 | 10/2012 | Gilman et al. |
| 2012/0271733 A1 | 10/2012 | Brooks |
| 2013/0124277 A1 | 5/2013 | Dooley et al. |
| 2013/0124429 A1 | 5/2013 | Zou et al. |
| 2013/0132169 A1 | 5/2013 | Dooley et al. |
| 2013/0159184 A1 | 6/2013 | Thaw |
| 2013/0173407 A1 | 7/2013 | Killian et al. |
| 2013/0246220 A1 | 9/2013 | Hammad et al. |
| 2013/0297431 A1 | 11/2013 | Deubell et al. |
| 2013/0304642 A1 | 11/2013 | Campos |
| 2014/0032381 A1 | 1/2014 | Killian et al. |
| 2014/0076978 A1 | 3/2014 | Smith et al. |
| 2014/0108125 A1 | 4/2014 | Maraz et al. |
| 2014/0122327 A1 | 5/2014 | Aleles et al. |

(56) References Cited

U.S. PATENT DOCUMENTS

| | | | |
|---|---|---|---|
| 2014/0172596 | A1 | 6/2014 | Ten Cate |
| 2015/0120418 | A1 | 4/2015 | Cervenka et al. |
| 2015/0220958 | A1 | 8/2015 | Tietzen et al. |
| 2015/0278801 | A1 | 10/2015 | Friedlander |
| 2015/0317619 | A1 | 11/2015 | Curtis |
| 2016/0125698 | A1 | 5/2016 | Jewaal |
| 2016/0203473 | A1 | 7/2016 | Curtis |
| 2017/0124586 | A1 | 5/2017 | Tepper et al. |

FOREIGN PATENT DOCUMENTS

| | | | |
|---|---|---|---|
| EP | 0348932 | A2 | 5/1995 |
| JP | 2-238593 | A | 9/1990 |
| JP | 2-278495 | A | 11/1990 |
| JP | 3-100791 | A | 4/1991 |
| JP | 4-165588 | A | 6/1992 |
| KR | 2010010217 | | 2/2010 |
| WO | WO 1986/02757 | A1 | 5/1986 |
| WO | WO 1986/07647 | A1 | 12/1986 |
| WO | WO 1988/03297 | A1 | 5/1988 |
| WO | WO 1989/08899 | A1 | 9/1989 |
| WO | WO 1991/09370 | A1 | 6/1991 |
| WO | WO 1993/09515 | A1 | 5/1993 |
| WO | WO 1994/10649 | A1 | 5/1994 |
| WO | WO 1994/28498 | A1 | 12/1994 |
| WO | WO 1995/03570 | A2 | 2/1995 |
| WO | WO 1997/46986 | A1 | 12/1997 |
| WO | WO0060487 | | 10/2000 |
| WO | WO2007133315 | A2 | 11/2007 |
| WO | 2008102329 | A2 | 8/2008 |
| ZA | 200709282 | | 10/2007 |

OTHER PUBLICATIONS

Co-pending U.S. Appl. No. 12/554,659, filed Sep. 4, 2009, titled "System, Mehtod, and Program Product for Foreign Currency Travel Account".
Co-pending U.S. Appl. No. 12/554,432, filed Sep. 4, 2009, titled "System, Program Product and Mehtods for Retail Activation and Reload Associated With Partial Authorization Transactions".
Cross, Sam Y., All About . . . the Foreign Exchange Market in the United States, 1998, Federal Reserve Bank of New York.
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Co-pending U.S. Appl. No. 12/607,780, filed Oct. 28, 2009, titled Shopping Center Gift Card Offer Fulfillment Machine, Program Products, and Associated Methods.
Co-pending U.S. Appl. No. 12/609,896, filed Oct. 30, 2009, titled Machine Methods, and Program Product for Electronic Order Entry.
Co-pending U.S. Appl. No. 12/626,349, filed Nov. 25, 2009, titled Machine, Methods, and Program Product for Electronic Inventory Tracking.
International Search Report for PCT/US09/56072 dated Oct. 20, 2009.
Bank Deals—Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.
VIPGift Receives Investment From Summit Partners and Bridgescale Partners, Nov. 11, 2008, Chattanooga, TN and Palo Alto, CA.
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
Co-pending U.S. Appl. No. 12/562,331, filed Sep. 16, 2009, titled Computerized Extension of Credit to Existing Demand Deposit Accounts, Prepaid Cards and Lines of Credit Based on Expected Tax Refund Proceeds, Associated Systems and Computer Program Products.
Co-pending U.S. Appl. No. 12/700,681, filed Feb. 4,2010, titled System and Computer Program Product to Issue a Retail Prepaid Card Including a User-Designed External Face Using a Chit and Related Computer Implemented Methods.
Co-pending U.S. Appl. No. 12/814,405, filed Jun. 11, 2010, titled Environmental-Friendly Fuel Credit Card System, Program Product, and Computer-Implemented Methods.
Co-pending U.S. Appl. No. 12/877,490, filed Sep. 8, 2010, titled System, Program Product, and Method for Debit Card and Checking Account Autodraw.
Co-pending U.S. Appl. No. 12/877,524, filed Sep. 8, 2010, titled System, Program Product, and Method for Debit Card and Checking Account Autodraw.
Co-pending U.S. Appl. No. 12/889,281, filed Sep. 23, 2010, titled Computer-Implemented Methods, Computer Program Products, and Systems for Enhanced Loan Product Repayments.
Co-pending U.S. Appl. No. 12/892,847, filed Sep. 28, 2010, titled Computer-Implemented Methods, Computer Program Products, and Systems for Management and Control of a Loyalty Rewards Network.
Co-pending U.S. Appl. No. 12/731,852, filed Mar. 25, 2010, titled Machine, Program Product, and Computer Implemented Methods for Confirming a Mobile Banking Request.
Co-pending U.S. Appl. No. 13/036,076, filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Office Action dated Mar. 4, 2011, in co-pending U.S. Appl. No. 12/338,684.
Office Action dated Mar. 17, 2010, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
Office Action dated Jul. 9, 2010 for U.S. Appl. No. 12/338,365.
Office Action dated Jul. 9, 2010 for U.S. Appl. No. 12/338,645.
Co-pending U.S. Appl. No. 12/465,277, filed May 13, 2009 titled "System, Program Product, and Computer-Implemented Method for Loading a Loan on an Existing Pre-Paid Card".
Co-pending U.S. Appl. No. 12/465,306, filed May 13, 2009 titled "System, Program Product, and Computer-Implemented Method for Loading a Loan on an Existing Pre-Paid Card".
Co-pending U.S. Appl. No. 12/465,803, filed May 14, 2009 titled "System, Program Product, and Method for Loading a Loan on an Existing Pre-Paid Card".
International Search Report for PCT/US2009/034692 dated Apr. 14, 2009.
International Search Report for PCT/US2009/039495 dated May 18, 2009.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1, 2009 at 5:50pm, HSBC Offshore Internet Banking (as cited on Notice of Allowance in co-pending U.S. Appl. No. 12/554,659).
Financial Advice Investment Money Oct. 1, 2009 at 7:25am, HSBC Offshore Internet Banking (as cited on Notice of Allowance in co-pending U.S. Appl. No. 12/554,659).
International Search Report for PCT/US2009/043988 dated Jul. 14, 2009.

(56) References Cited

OTHER PUBLICATIONS

International Search Report for PCT/US2009/039492 dated May 14, 2009.
Microtrax Ltd., PC Electronic Payment Systems Reference Manual; 1995 (381 pages).
John P. Caskey and Gordon H. Selton, Jr.; Is the Debit Card Revolution Finally Here?; Federal Reserve Bank of Kansas City, Economic Review; Fourth Quarter 1994; pp. 70-95, vol. 79 #4 (17 pages).
Laura Castaneda; Business Promote Services to Customers Day In and Day Out; The Dallas Morning News, Nov. 26, 1994 (3 pages).
Margaret Mannix, Checkout Tech, U.S. News and World Report, Feb. 27, 1995 (6 pages).
Credit Terminals to be Used at Canadian Liquor Outlets, Card News, Jan. 23, 1995 (1 page).
Debit Card Popularity on the Rise, Chain Store Age Executive, Jan. 1994 (1 page).
Debit Goes to Dinner, Credit Card Management, New York, Oct. 1994 (2 pages).
Alan Peppard, Down and Dirty in Deep Ellum, The Dallas Morning News, Dec. 3, 1994 (2 pages).
Everest Reference Manual, VeriFone Part No. 25399, Revision A, Manual Revision 1.0, Jul. 1995 (66 pages).
Express Cards and Trains, Chain Store Age Executive Edition, Jan. 1995 (1 page).
Suzanne Brown, Goodnight Amy, Meg, Beth and Jo, Rocky Mountain News, Dec. 8, 1994 (1 page).
Robert J. Klein, Here Comes the Debit Card, D&B Reports, Jul./Aug. 1990 (2 pages).
Hypercom S7C Advertisement, Chain Store Age, Sep. 1995 (4 pages).
Hypercom S7SC Advertisement, Chain Store Age, Feb. 1996 (2 pages).
IBM 4680-4690 Advanced Payment System for Chain Drug Sales Application User's Guide, Nov. 1996 (256 pages).
IBM 4680-4690 Advanced Payment System for Chain Drug Sales Application User's Guide, Jul. 1996 (248 pages).
IBM 4680-4690 Advanced Payment System for Supermarket Application User's Guide, Sep. 1996 (222 pages).
Fox, Linda A., Keep an Eye on Your Credit Card, The Toronto Sun, Aug. 9, 1996 (1 page).
Pyatt, Rudolph A., Jr., Mobil Stations to Permit Use of Bank Cards, The Washington Post (1 page).
NCR 4430-5000 MSR/PIN User's Guide, 1994 (265 pages).
Nieman Marcus: High-Tech for the Holidays, Adweek, Dec. 5,1994 (1 page).
Neiman Marcus Offers Electronic Gift Certificate, Card Fax, Jan. 23, 1995 (1 page).
Neiman Marcus to Launch NM Express Automated Gift Card, PR Newswire, Nov. 22, 1994 (1 page).
NM Express Card Advertisement, The New Yorker, Dec. 12, 1994 (3 pages).
Service Mark Registration No. 1,981,044 for "NM Express Card", registered Jun. 18, 1996 (1 page).
Omni 480/490 Programmer's Guide, VeriFone Part No. 12924—Revision A, Manual Revision 1.0, Oct. 1993 (228 pages).
One Company's Diversification Shakes Up Peripherals Market, Chain Store Age, Jun. 1996 (3 pages).
O'Keefe, Michael, Portable POS Debit Terminal Mean Greater Convenience, Bank Systems & Technology, Nov. 1994 (2 pages).
POS Terminal Can Handle Direct Debits, ABA Banking Journal, Sep. 1984 (2 pages).
Racal Corp. Advertisement, POS Terminal Eliminates Credit Card Vouchers, ABA Banking Journal, Nov. 1985 (2 pages).
Szabo, Joan C., The Changing World of Financial Services, Nation's Business, Oct. 1994 (7 pages).
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
David B. Barnes, VeriFone Introduces Everest (TM) Customer Activated Payment System to Multi-lane Retail Market, PR Newswire, Feb. 20, 1995 (2 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, Verifone Part No. 00483-Revision D, Manual Revision 3.01, Apr. 1990 (144 pages).
Microtrax Ltd. Omni 490M (and 490ML) Operation Manual for Integrated and Non-Integrated Configurations, 1994 (60 pages).
Microtrax Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).
IBM 4680 General Sales Application Electronic Funds Transfer User's Guide, IBM Corp., Research Triangle Park, NC, Dec. 1990 (260 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park, NC, Jun. 1991 (429 pages).
Krino, Gary, et al., A Birthday Card That Pays Off, The Orange County Register, Jul. 19, 1996 (2 pages).
Cohen, Bruce, Alternative to Cash Gains Ground, The Financial Post, Apr. 22, 1994 (2 pages).
Bank of Boulder Pos Debit Solution at the Table Now in Beta: First Bank to Certify IVI Spirit C2000 on MAPP (R), Business Wire, Aug. 3, 1994 (1 page).
Jane Boon Pearlstine, Lenders, Borrowers Hook Up Over the Web: Prosper.com and Other Sites Provide Forum for Individual Bidders Willing to Offer Small Loans, Wail Street Journal, May 20, 2006.
United Nations Conference on Trade and Development, E-Finance and Small and Medium-Size Enterprises (SMEs) in Developing and Transition Economies, UNCTAD Expert Meeting, Oct. 17, 2001.
Tim Jones, Paradigms lost, RSA Journal, Oct. 2006, pp. 28-31.
Diego Rumiany, Internet Bidding for Microcredit: making it work in the developed world, conceiving it for the developing world, Mar. 2007.
Stefan Hens, Thomas Meyer, and Antje Stobbe, Implications of Web 2.0 for financial institutions: Be a driver, not a passenger, Munich Personal RePEc Archive, Jul. 31, 2007.
Matt Flannery, Kiva and the Birth of Person to Person Microfinance, Innovations, pp. 31-56, Winter & Spring 2007.
Michael K Hulme and Collette Wright, Internet Based Social Lending: Past, Present and Future, Social Futures Observatory, Oct. 2006.
Richard W Coleman, Is the Future of the Microfinance Movement to be Found on the Internet?, International Trade and Finance Assiciation Working Papers 2007.
Amanda Scott and Patrick Towell, The web we weave, Financial World, pp. 12-15, Nov. 2006.
Prosper, Access and Transparency through Person-to-Person Lending, FDIC Advisory Committee on Economic Inclusion, Mar. 28, 2007.
Co-pending U.S. Appl. No. 12/338,365, filed Dec. 18, 2008, titled "Transfer Account Systems, Computer Program Products, and Associated Computer-Implemented Methods".
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,497, filed Dec. 18, 2008, titled "Private Label Promotion Card System, Program Product, and Associated Computer-Implemented Methods".

(56) References Cited

OTHER PUBLICATIONS

Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products, and Methods to Prioritize Payments From Preselected Bank Accounts".
Co-pending U.S. Appl. No. 12/338,645, filed Dec. 18, 2008, titled "Transfer Account Systems, Computer Program Products, and Methods to Prioritize Payments from Preselected Bank Accounts".
Co-pending U.S. Appl. No. 12/338,684, filed Dec. 18, 2008, titled "Transfer Account Systems, Computer Program Products, and Associated Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/417,199, filed Apr. 2, 2009, titled System, Program Product, and Associated Methods to Autodraw for Micro-Credit Attached to a Prepaid Card.
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/407,320, filed Mar. 19, 2009, titled "Computerized Extension of Credit to Existing Demand Deposit Accounts, Prepaid Cards and Lines of Credit Based on Expected Tax Refund Proceeds, Associated Systems and Computer Program Products".
Co-pending U.S. Appl. No. 12/417,162, filed Apr. 2, 2009, titled "System, Program Product, and Method for Debit Card and Checking Account Autodraw".
Office Action in co-pending U.S. Appl. No. 12/609,896 dated Apr. 5, 2011.
Office Action in co-pending U.S. Appl. No. 12/417,162 dated Apr. 13, 2011.
International Search Report dated May 27, 2009 for PCT/US2009/039504 filed Apr. 3, 2009.
International Search Report dated Jun. 8, 2009 for PCT/US2009/039512 filed Apr. 3, 2009.
International Search Report dated Jun. 30, 2009 for PCT/US2009/043978 filed May 14, 2009.
International Search Report for co-pending PCT Application No. PCT/US2008/087689 dated Jun. 17, 2009.
Orszag, Peter, "Unemployment Insurance as an Economic Stimulus", Center for Budget and Policy Priorities, Nov. 15, 2011.
Powell, Robert I., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
Notice of Allowance for co-pending U.S. Appl. No. 12/417,162 dated Oct. 1, 2012.
Office Action for co-pending U.S. Appl. No. 13/214,126 dated Oct. 4, 2012.
Notice of Allowance for co-pending U.S. Appl. No. 12/607,780 dated Oct. 9, 2012.
Final Office Action for co-pending U.S. Appl. No. 13/232,700 dated Oct. 12, 2012.
Office Action for co-pending U.S. Appl. No. 13/284,524 dated Oct. 15, 2012.
Notice of Allowance for co-pending U.S. Appl. No. 13/601,724 dated Oct. 18, 2012.
Office Action for co-pending U.S. Appl. No. 13/536,765 dated Nov. 30, 2012.
Notice of Allowance for co-pending U.S. Appl. No. 13/282,186 dated Dec. 17, 2012.
Office Action for co-pending U.S. Appl. No. 12/607,780 dated Mar. 19, 2012.
Notice of Allowance for co-pending U.S. Appl. No. 12/465,803 dated Mar. 20, 2012.
Notice of Allowance for co-pending U.S. Appl. No. 12/562,331 dated Mar. 20, 2012.
Ex-parte Quayle Action for co-pending U.S. Appl. No. 12/700,681 dated Mar. 23, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Final Office Action for co-pending U.S. Appl. No. 12/338,540 dated Mar. 5, 2012.
Office Action for co-pending U.S. Appl. No. 12/338,497 dated Aug. 18, 2011.
Wolf, File History of US 2005/0278347.
Check Cashers Move Into Cards, Accounts (Cover Story), ATM & Debit News [serial online], Apr. 20, 2006, 6(24), pp. 1-3, available from Business Source Complete, Ipswich, MA.
Mangu-Ward, K.; (Oct. 2009), Payday of Reckoning, Reason, 41(5), pp. 40-47, retrieved Jun. 15, 2012, from Research Library (Document ID:1861658171).
Wolf, Alan Steven, What to do when the Chain Breaks, Servicing Management, Feb. 1997, 3 pages.
99Bill Launches Installment Credit Services, (Aug. 21, 2008), PR Newswire, 2 pages, retrieved Jul. 9, 2012, from Business Dateline (Document ID: 1536854041).
Intralinks, Inc. Begins European Rollout of Its Proven Electronic Solution for Loan Syndication, London (Business Wire), Oct. 8, 1997, 3 pages.
Final Office Action for co-pending U.S. Appl. No. 13/232,405 dated May 22, 2012.
Office Action for co-pending U.S. Appl. No. 13/405,051 dated Jun. 6, 2012.
Final Office Action for co-pending U.S. Appl. No. 12/877,524 dated Jun. 8, 2012.
Notice of Allowance for co-pending U.S. Appl. No. 12/700,681 dated Jun. 11, 2012.
Notice of Allowance for co-pending U.S. Appl. No. 13/365,982 dated Jun. 26, 2012.
Office Action for co-pending U.S. Appl. No. 12/554,432 dated Jun. 29, 2012.
Office Action for co-pending U.S. Appl. No. 13/349,290 dated Jul. 3, 2012.
Notice of Allowance for co-pending U.S. Appl. No. 12/338,540 dated Jul. 9, 2012.
Office Action for co-pending U.S. Appl. No. 13/282,186 dated Jul. 13, 2012.

(56) References Cited

OTHER PUBLICATIONS

Notice of Allowance for co-pending U.S. Appl. No. 13/330,397 dated Jul. 18, 2012.
Final Office Action for co-pending U.S. Appl. No. 12/367,187 dated Jul. 19, 2012.
Final Office Action for co-pending U.S. Appl. No. 13/232,700 dated Jul. 19, 2012.
Final Office Action for co-pending U.S. Appl. No. 12/626,349 dated Jul. 20, 2012.
Office Action for co-pending U.S. Appl. No. 13/036,076 dated Jul. 24, 2012.
Notice of Allowance for co-pending U.S. Appl. No. 13/481,950 dated Jul. 30, 2012.
Notice of Allowance for co-pending U.S. Appl. No. 13/405,079 dated Aug. 6, 2012.
Notice of Allowance for co-pending U.S. Appl. No. 13/474,519 dated Aug. 27, 2012.
Office Action for co-pending U.S. Appl. No. 12/889,281 dated Aug. 30, 2012.
Notice of Allowance for co-pending U.S. Appl. No. 13/232,405 dated Sep. 4, 2012.
Notice of Allowance for co-pending U.S. Appl. No. 12/338,497 dated Sep. 17, 2012.
Notice of Allowance for co-pending U.S. Appl. No. 12/877,490 dated Sep. 20, 2012.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle (cited in Final Office Action in co-pending U.S. Appl. No. 12/338,684 dated Sep. 23, 2011).
Notice of Allowance in co-pending U.S. Appl. No. 12/338,645 dated Oct. 3, 2011.
Office Action in co-pending U.S. Appl. No. 12/417,182 dated Sep. 28, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Downes, How to avoid exchange charges Wasting Money a foreign currency bank account could be the answer, The Daily Telegraph, London (UK), Mar. 10, 2007.
Office Action for co-pending U.S. Appl. No. 13/232,405 dated Feb. 2, 2012.
Office Action for co-pending U.S. Appl. No. 12/877,524 dated Feb. 14, 2012.
Notice of Allowance for co-pending U.S. Appl. No. 12/417,182 dated Feb. 14, 2012.
Final Office Action for co-pending U.S. Appl. No. 12/338,497 dated Mar. 1, 2012.
Final Office Action for co-pending U.S. Appl. No. 12/465,277 dated Feb. 28, 2012.
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.
Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6. 2012.
Office Action from co-pending U.S. Appl. No. 12/731,852 dated Dec. 22, 2011.
Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).
Notice of Allowance from co-pending U.S. Appl. No. 12/465,803 dated Dec. 20, 2011.
MasterCard Electronic prepaid (Oct. 2003). The Nilson Report, (798), (Dec. 9, 2011), The Banking Source (Document ID 474833171).
Office Action for co-pending U.S. Appl. No. 13/036,076 dated Jan. 29, 2015.
Office Action for co-pending U.S. Appl. No. 13/232,700 dated Jan. 29, 2015.
Office Action for co-pending U.S. Appl. No. 13/782,550 dated Dec. 17, 2014.
Office Action for co-pending U.S. Appl. No. 14/071,386 dated Dec. 16, 2014.
Office Action for co-pending U.S. Appl. No. 12/626,349 dated Nov. 27, 2013.
Final Office Action for co-pending U.S. Appl. No. 12/367,187 dated Feb. 12, 2014.
Final Office Action for co-pending U.S. Appl. No. 12/389,749 dated Dec. 11, 2014.
Final Office Action for co-pending U.S. Appl. No. 12/889,281 dated Apr. 8, 2013.
Final Office Action for co-pending U.S. Appl. No. 12/892,847 dated Aug. 12, 2014.
Final Office Action for co-pending U.S. Appl. No. 12/892,847 dated Mar. 29, 2013.
Final Office Action for co-pending U.S. Appl. No. 13/036,076 dated Apr. 8, 2013.
Final Office Action for co-pending U.S. Appl. No. 13/214,126 dated Aug. 1, 2013.
Final Office Action for co-pending U.S. Appl. No. 13/349,290 dated Mar. 14, 2013.
Garriss, J., (2004), Forging an ideal HSA, Workspan, 47(5), 18-25, Retrieved Sep. 3, 2013.
Health Savings Account (HSA): Horizon Blue Cross Blue Shield of New Jersey, Small Employer Guide, Jan. 2006, 18 pages.
Hori et al. "Did the Shopping Coupon Program Stimulate Consumption? Evidence from Japanese Micro Data" ESRI Discussion Paper Series No. 12, Apr. 2002, 45 pages.
Kent FOC Newsletter, retrieved at www.accesskent.com/Courts/FOC/pdfs/newsletter/022006.pdf, Feb. 2006, 1 page.
Letter of Credit Explained: What is Letter of Credit?, Dec. 26, 2005, 2 pages.
Office Action for co-pending U.S. Appl. No. 12/367,187 dated Aug. 1, 2013.
Office Action for co-pending U.S. Appl. No. 12/367,187 dated Sep. 24, 2014.
Office Action for co-pending U.S. Appl. No. 12/389,749 dated Oct. 3, 2014.
Office Action for co-pending U.S. Appl. No. 12/626,349 dated Dec. 12, 2014.
Office Action for co-pending U.S. Appl. No. 12/731,852 dated Nov. 10, 2014.
Office Action for co-pending U.S. Appl. No. 12/892,847 dated Nov. 5, 2014.
Office Action for co-pending U.S. Appl. No. 13/287,725 dated Aug. 25, 2014.
Office Action for co-pending U.S. Appl. No. 13/287,725 dated Jan. 17, 2014.
Office Action for co-pending U.S. Appl. No. 13/287,725 dated Sep. 26, 2013.
Office Action for co-pending U.S. Appl. No. 13/349,290 dated Oct. 22, 2014.
Office Action for co-pending U.S. Appl. No. 13/450,617 dated May 12, 2014.
Office Action for co-pending U.S. Appl. No. 13/450,617 dated Oct. 28, 2014.
Office Action for co-pending U.S. Appl. No. 13/782,550 dated Sep. 12, 2014.

(56) References Cited

OTHER PUBLICATIONS

Office Action for co-pending U.S. Appl. No. 13/863,578 dated Sep. 30, 2014.
Wolfe, Daniel, An E-Variation on Payday Loan Theme, American Banker, Jul. 28, 2005.
Business Debit Card Agreements; 3 pages; May 2004.
FDIC, FDIC Law, Regulations, Related Acts—consumer Protection by FDIC; 10 pages. Oct 2005.
Bruene "Expensify Launches Decoupled Credit/Debit Card Using Prepaid Model" retrieved at www.netbanker.com/2008/09/expensify_launches-decoupled_credit_debit_card-using_prepaid_model.html, Sep. 11, 2008, 3 pages.
Film Financing Models: Rewards Against All Odds Are Varied, Video Age International, vol. 31, No. 5, Oct. 2011, 3 pages.
Office Action from co-pending U.S. Appl. No. 12/626,349, dated Nov. 22, 2011.
TreasurySoftware.com; published Jan. 17, 2006 at the website: http://www.treasuresoftware.com:80/ach_file_format_html; 5 pages.

* cited by examiner

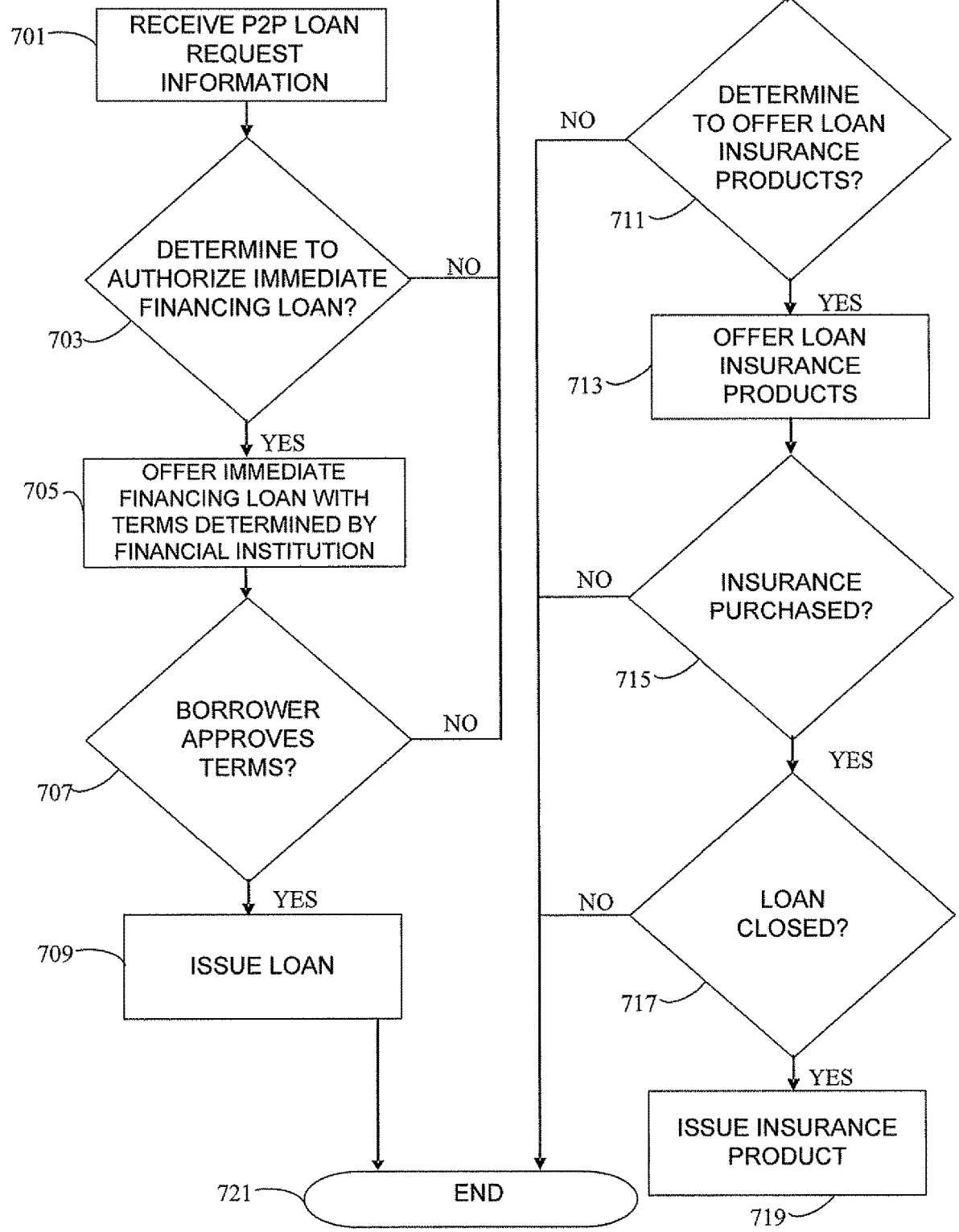

PERSON-TO-PERSON LENDING PROGRAM PRODUCT, SYSTEM, AND ASSOCIATED COMPUTER-IMPLEMENTED METHODS

RELATED APPLICATIONS

This application claims priority to and the benefit of U.S. Provisional Patent Application No. 61/033,069, titled "Person-to-Person Lending Program Product, System, and Associated Methods", fled on Mar. 3, 2008, incorporated herein by reference in its entirety.

BACKGROUND OF THE INVENTION

Field of Invention

The present invention relates generally to the financial service and lending industries, and, more particularly, to products, systems, and associated methods to finance a gap filling loan for a deficiency amount associated with a person-to-person loan request and to provide loans and guarantees from a financial institution for loan requests associated with a person-to-person lending.

Description of the Related Art

Person-to-person lending, sometimes called P2P lending or alternately peer-to-peer lending, involves individual consumers making loans to other individual consumers. Increasingly prevalent, person-to-person lending enjoys significant, favorable publicity and positive feedback from United States bank regulators. Today, various person-to-person or peer-to-peer ("P2P") lending websites have been developed and launched to provide access to loans, typically unsecured loans, to individual consumers.

A large number of borrowers, however, do not get their loan requests fully funded. Borrower requests far exceed lender dollars available. Because some P2P lending websites utilize group or affinity relationships, such as relationships in Facebook or other social media websites, borrowers with no group or affinity relationship can have difficulty attracting individual lenders. Borrowers also can make poorly thought-out or confusing loan requests, putting off individual consumer lenders. In addition, mislabeled credit grades and overly-simplified credit grading can result in borrowers not getting their loans fully funded.

Perhaps negatively affecting the P2P lending marketplace, state regulations in many states limit lending interest rates. Moreover, the P2P lending market suffers from, in general, a lack of sophisticated underwriting models to qualify borrowers and access to many secondary capital markets.

It is known that millions of prepaid cards are issued each year in the United States. It is also known that many of the customers of prepaid cards rely primarily on cash and a prepaid card account for their personal finances; these customers often do not have a traditional checking, savings, or other bank deposit account, and they usually do not write checks.

SUMMARY OF INVENTION

In view of the foregoing, Applicant has recognized one or more source of many of these problems and provides enhanced embodiments of computerized methods of financing an individual consumer loan request associated with P2P lending, and associated systems and computer program products. Embodiments of the present invention, for example, provide financing for a deficiency amount for a P2P loan request, quickly satisfying a P2P loan request, and guaranteeing a P2P loan.

According to embodiments of the present invention, when an individual consumer borrower associated with a P2P lending website, or other P2P communication network, does not have a loan request fully funded for the preselected loan value by individual consumer lenders, for example, a financial institution such as a bank can finance a gap filling loan for the deficiency amount at preselected loan terms from the financial institution. The financial institution identifies the deficiency amount for a P2P loan request, determines whether to authorize a financial institutional loan for the deficiency amount, authorizes a gap filling loan at preselected loan terms from the financial institution, and issues the loan to an individual consumer borrower responsive to approval of the preselected terms. As understood by those skilled in the art, the financial institution serves as stop-gap for loan requests that are not fully funded but meet the financial institution's credit strategy to thereby fulfill an uncommitted portion of the loan requests. Some benefits include, for example, a significant increase in loan closings because otherwise unsatisfied loan requests gain a second opportunity to obtain needed funds. In addition, individual consumer borrowers now have an option of a blended loan or interest rate, according to embodiments of the present invention. For example, if a borrower posts a request for $5,000 with a 10% maximum rate limitation and lenders offer a total of $4,000 at the 10% interest rate, the financial institution can offer to loan the remaining $1,000, the deficiency amount, at a rate of 15%. The borrower can then choose to accept a blended rate of 11% (being $4,000 at 10% and $1,000 at 15%), in addition to the options of a $4,000 loan at 10%, or no loan at all. Moreover, the involvement of the financial institution, for example, can advantageously put competitive or timing pressures on individual consumer lenders to thereby force greater competition among the lenders and add an increase time component to bidding or offering P2P loans.

According to other embodiments of the present invention, a financial institution can provide immediate financing terms responsive to an individual consumer borrower loan request of a preselected loan value associated with a P2P lending website so that the individual consumer can choose the immediate loan offer with terms determined by the financial institution or choose to solicit individual consumer loan offers with more favorable terms through the P2P lending website. As understood by those skilled in the arts, the immediate financing option provided by the financial institution, for example, can guarantee that the loan will be funded (assuming the borrower is willing to accept the terms of the financial institution) and establishes a ceiling on the "zone of possible agreement." For example, if a borrower posts a request for $5,000 with a 10% maximum rate limitation, the financial institution can offer immediate financing at a rate of 15%. The borrower can then choose to accept the rate of 15% immediately, if timing is critical, or choose to wait for individual consumer loan offers with a more favorable rate, if timing is less critical. As understood by those skilled in the art, the benefits of immediate financing embodiments and gap filling loan embodiments, especially in combination when the borrower is effectively prequalified for the gap filling loan, include an increase in loan closings and an increase in the availability of a blended rate for the borrower. The blended rate may or may not exceed the desired rate or a maximum rate of the P2P loan request, as understood by those skilled in the art.

According to yet other embodiments of the present invention, a financial institution can guarantee a P2P loan associated with a P2P lending website. The P2P lending website receives the loan request. Then the financial institution determines whether to authorize insurance products associated with the P2P loan request; offers for purchase one or more insurance products, including, for example, debt cancellation insurance and credit life insurance; and issues insurance products responsive to its purchase and the closing of the P2P loan. As understood by those skilled in the art, the availability of insurance products, such as, for example, debt cancellation insurance and credit life insurance, can reduce lender risk, improve the comfort level of a lender with respect to repayment, and provide assurance to a lender, resulting in a greater willingness to enter into loans. Therefore, embodiments of the present invention result in a significant increase in loan closings as more individual consumers are willing to lend money with the financial institution offering insurance. As an example, a lender is "on the fence" on a particular loan request, but is willing to lend with the guarantee of a bank or other financial institution. Then the lender can purchase a guarantee from a financial institution for an agreed upon fee based on the borrower's risk profile. If borrower defaults, the financial institution repays lender's unpaid balance owed and steps into the lender's repayment position.

According to another embodiment of the present invention, the financial institution can be a federally-chartered bank subject to federal banking laws and regulations and not subject to state banking laws and regulations. Therefore, the federally-chartered financial institution enjoys rate preemption; that is, state licensing requirements, as well as regulations in many states that limit lending interest rates, are preempted and do not apply to the federally-chartered financial institution. As understood by those skilled in the art, a federally-chartered financial institution can operate in every state with a consistent implementation nationally rather than a state-by-state approach and can charge any loan or interest rate for the gap filling loans or immediate financing loans without regard to state law. For example, if a borrower posts a loan request for $5,000 and the borrower resides in a state with a 10% maximum interest rate limitation, the financial institution can offer immediate financing or a gap filling loan at an interest rate of 15%. In addition, if the borrower resides in a state where the P2P lending website does not have a license needed to operate, rather than reject the customer, however, the P2P lending website can disclose that the financial institution is willing to fulfill the entire loan request value at a rate of, for example, 17% immediately.

Embodiments of the present invention also include additional features. For example, the financial institution can bundle the gap filling loans, immediate financing loans, or both for sale on secondary capital markets, as understood by those skilled in the arts. According to embodiments of the present invention, the financial institution can employ sophisticated underwriting models and preselected authorization parameters to determine whether to authorize a gap filling loan, a financial institutional loan for the entire selected loan value, and one or more insurance products to guarantee the loan. In addition, the financial institution can load the loan value to a prepaid card according to embodiments of the present invention so that the loan request is converted into a prepaid card having an associated value and being capable of purchasing goods and so that the P2P lending marketplace is not limited to individual consumers with traditional bank accounts, checking accounts, and other such accounts as understood by those skilled in the arts, but expanded to include those using prepaid cards who otherwise may have difficulty in accessing the P2P lending marketplace.

Embodiments of the present invention provide other benefits to the P2P lending website. An association with the financial institution, for example, can legitimize the P2P lending website. The addition of gap filling loans, according to embodiments of the present invention, allows the P2P lending website to preserve its social feel with the financial institution serving simply as a backstop for both individual consumer borrowers and lenders. Also, reporting the financial institution performance, as understood by those skilled in the arts, can create a "Beat the Stuffy, White Shirt Banker" promotional opportunity for the P2P lending website.

For a financial institution, for example, embodiments of the present invention provide additional benefits, including a low cost customer acquisition channel and cross marketing opportunities for other products and services. As understood by those skilled in the arts, the financial institution can purchase receivables from the individual consumer lenders, forming a secondary market and providing individual consumer lenders the ability to access cash tied up in loans.

Additionally, the financial institution can share its sophisticated underwriting models and preselected authorization parameters with individual consumer lenders wanting to piggyback on the financial institution's credit standards according to embodiments of the present invention to thereby further legitimize the P2P lending website and the underwriting and performance data reported by the P2P lending website, as understood by those skilled in the art.

Embodiments of the present invention provide, for example, a system to finance an individual consumer loan request associated with a P2P lending website. The system can include a first computer defining a borrower computer, which includes a program product, e.g., software, stored in memory to provide information for a P2P loan request through an electronic communications network, e.g., the Internet or World Wide Web, to a second computer defining a P2P lending website computer. The P2P lending website computer has an electronic forum for hosting a P2P loan request and for loan offers by one or more individual consumer lenders. The loan request information includes a preselected loan value. Each loan offer associated with the electronic forum is responsive to the P2P loan request and has a loan value that fulfills all or a portion of the P2P the preselected loan value. The system further includes one or more third computers defining a lender computer, which can include, for example, a program product stored in memory to provide loan offer information responsive to the P2P loan request to the P2P lending website computer through the electronic communications network. The system also, for example, can include a fourth computer defining a financial institution computer, which receives loan information from the P2P lending website computer through the electronic communications network. The financial institution computer can include a program product, for example, as discussed below.

Embodiments of the present invention include, for example, a program product associated with a financial institution computer, stored on a tangible computer memory media, operable on a computer, and used to finance an individual consumer loan request. The computer program product, for example, can include a set of instructions that, when executed by the computer, cause the computer to perform various operations. The operations include identifying a deficiency amount for the P2P loan request associated with the P2P lending website. The deficiency amount is the difference between the preselected loan value of the P2P loan request and a value of an aggregate of any individual consumer loan offers responsive to the P2P loan request, if the value of the aggregate is less than the preselected loan value. The operations also include the financial institution determining whether to authorize a gap filling loan for the deficiency amount to an individual consumer requesting the loan and authorizing the gap filling loan for the deficiency amount at preselected loan terms from the financial institution. The operations further include issuing the gap filling loan to the individual consumer making the P2P loan request responsive to approval of the preselected terms by the individual consumer.

In addition, embodiments of the present invention include other program products, systems, and associated methods for satisfying a P2P loan request, as will be understood by those skilled in the art.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 7 is a flowchart of a process of issuing a loan or insurance product from a financial institution responsive to a P2P loan request according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Embodiments of the present invention provide computerized methods of financing an individual consumer loan request associated with a P2P lending website, and associated systems and program products. Embodiments of the present invention provide for financing a deficiency amount for a P2P loan request, quickly satisfying a P2P loan request with a loan from a financial institution, and guaranteeing a P2P loan through insurance products.

Figure 1:
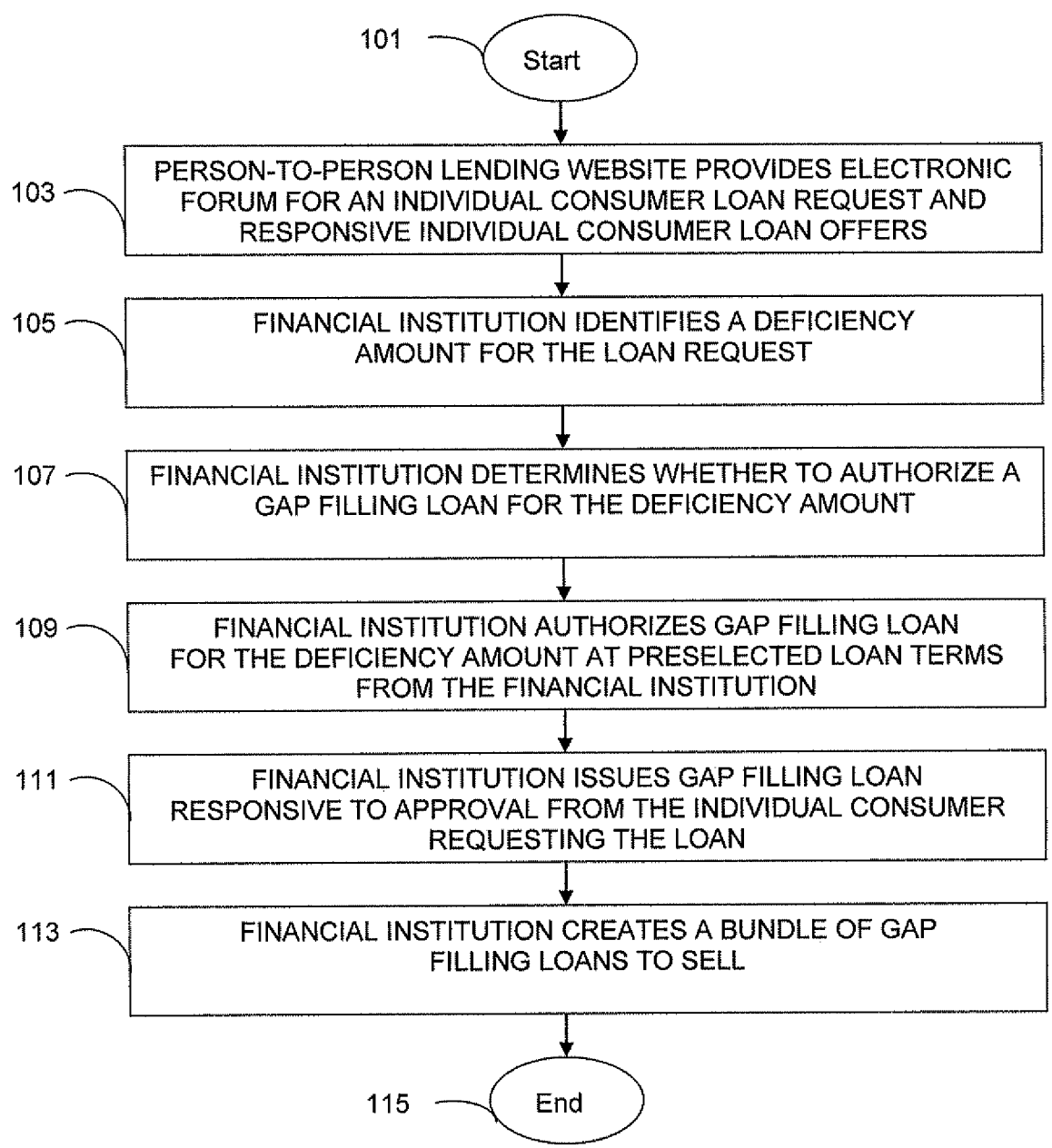
FIG. 1 is a schematic flow diagram of a method of financing a deficiency amount for a P2P loan request according to an embodiment of the present invention.

FIG. 1 illustrates an embodiment of the present invention which provides a computerized method of financing a deficiency amount for a P2P loan request. The method, for example, includes a P2P lending website providing an electronic forum for a P2P loan request by an individual consumer and for loan offers by one or more individual consumers (block 103). The loan request has a preselected loan value. The loan request can include a purpose for the loan, such as, a home improvement, travel, education expenses, and others as understood by those skilled in the art. Each loan offer is responsive to the P2P loan request and has a loan value that fulfills all or a portion of the preselected loan value. The method also includes identifying a deficiency amount for the P2P loan request associated with the P2P lending website (block 105). The deficiency amount is the difference between the preselected loan value of the P2P loan request and a value of an aggregate of any individual consumer loan offers responsive to the P2P loan request, if the value of the aggregate is less than the preselected loan value, for example, The method further includes determining whether to authorize a gap filling loan for the deficiency amount from a financial institution to the individual consumer requesting the loan (block 107) and authorizing the gap filling loan for the deficiency amount at preselected loan terms from the financial institution (block 109). The method continues with issuing the gap filling loan to the individual consumer making the P2P loan request responsive to approval of the preselected terms by the individual consumer (block 111). The method further includes the financial institution creating a collection of a plurality of P2P loans to define a bundle of P2P loans to sell, in which a bundle includes one or more gap filling loans (block 113).

As understood by those skilled in the art, the financial institution serves as stop-gap for loan requests that are not fully funded but meet the financial institution's credit strategy, fulfilling the uncommitted portion of the loan requests. Benefits include, for example, a significant increase in loan closings as otherwise unsatisfied loan requests gain a second opportunity, more options for a blended rate for individual consumer borrowers, and additional pressure on individual consumer lenders due to the financial institution involvement, as understood by those skilled in the art. Moreover, the sale of loans, for example, gap filling loans, in a collection, bundle, or pool can reduce risk through diversification and can make, for example, otherwise minor and uneconomical investments of sufficient worth for interest by secondary capital markets, as understood by those skilled in the art.

As understood by those skilled in the art, the embodiments of the present invention are a supplement and addition to a P2P lending websites. Existing P2P lending websites include, for example: Zopa of San Franscisco, Calif. (www.us.zopa.com), Lending Club of Sunnyvale, Calif. (www.lendingclub.com), and Prosper (www.prosper.com), as understood by those skilled in the art.

Figure 2:
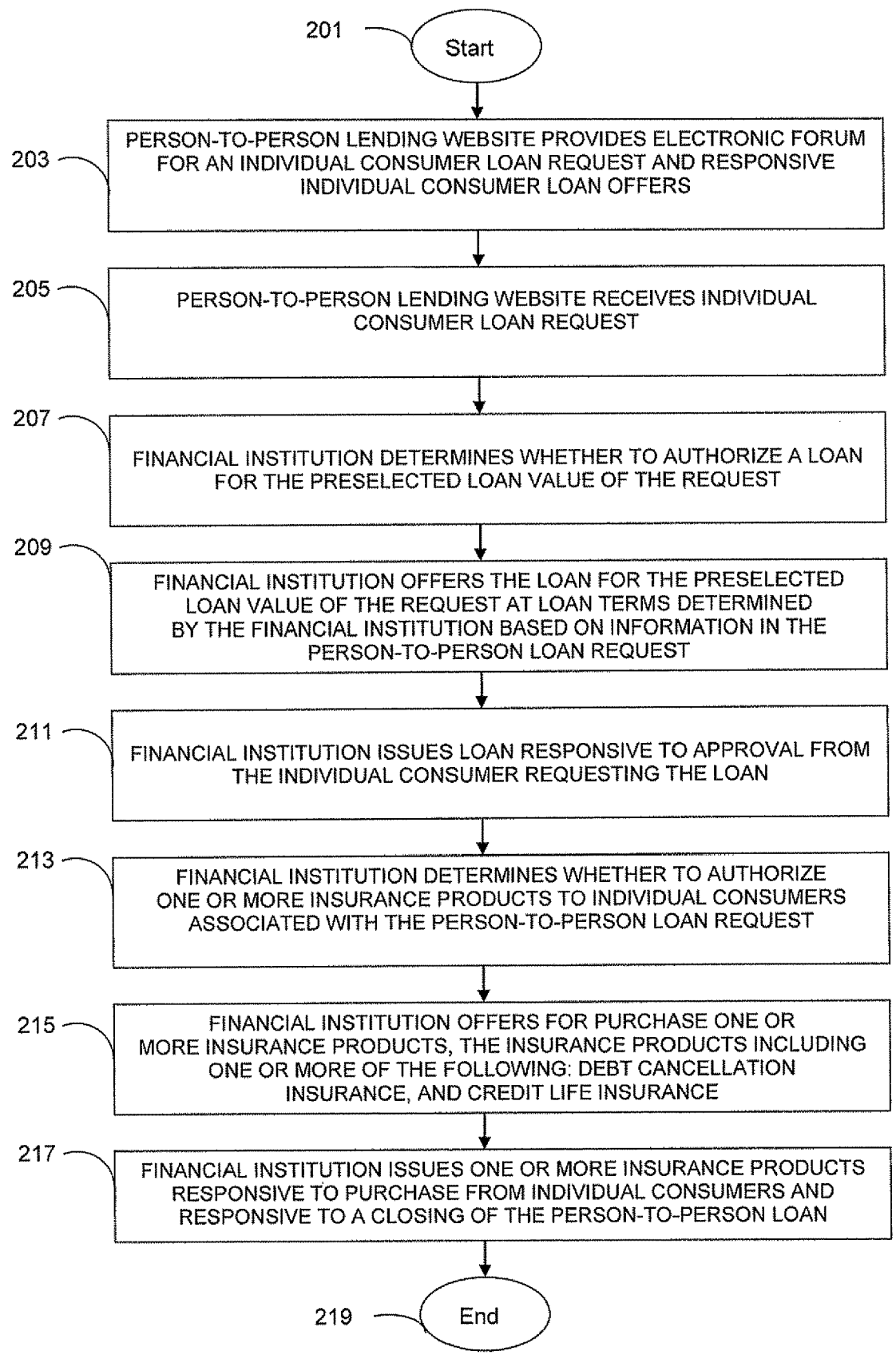
FIG. 2 is a schematic flow diagram of a method of satisfying a P2P loan request according to an embodiment of the present invention.

FIG. 2 illustrates another embodiment of the present invention, which, for example, provides a computer-implemented method of satisfying a P2P loan request. The computer-implemented method includes a P2P lending website providing an electronic forum for a P2P loan request by an individual consumer and for loan offers by one or more individual consumers (block 203). The loan request has a preselected loan value. Each loan offer is responsive to the P2P loan request and has a loan value that fulfills all or a portion of the preselected loan value. The computer-implemented method also includes receiving the P2P loan request (block 205). The loan request includes information about the individual consumer making the P2P loan request, as understood by those skilled in the art. The computer-implemented method further includes a financial institution determining whether to authorize a financial institutional loan for the preselected loan value to the individual consumer making the P2P loan request based on the information in the P2P loan request (block 207). The computer-implemented method continues with the financial institution offering the financial institutional loan for the preselected loan value at loan terms determined by the financial institution based on information in the P2P loan request (block 209) so that the individual consumer requesting the loan can choose an immediate loan offer with terms determined by the financial institution or choose to solicit individual consumer loan offers with more favorable terms through the P2P lending website. The computer-implemented method farther includes issuing the financial institutional loan responsive to approval by the individual consumer requesting the loan of the terms from the financial institution (block 211). In addition, the computer-implemented method includes the financial institution determining whether to authorize one or more insurance products to individual consumers associated with the P2P loan request (block 213). The computer-implemented method continues with the financial institution offering for purchase one or more insurance products to the individual consumers associated with the P2P loan request (block 215). The insurance products include one or more of the following: debt cancellation insurance, and credit life insurance, as understood by those skilled in the art. Debt cancellation insurance includes a loan term or contractual arrangement modifying loan terms under which a bank agrees to cancel all or part of a customer's obligation to repay an extension of credit upon the occurrence of a specified event, as understood by those skilled in the art. Credit life insurance is a type of insurance, often bought by mortgagors, in which the amount of the policy matches the loan balance at any given time; credit life insurance is designed so that the loan will be paid off in full in the event of death, as understood by those skilled in the art. The computer-implemented method also includes issuing one or more insurance products responsive to a purchase from individual consumers and responsive to a closing of the loan (block 217).

As understood by those skilled in the arts, the immediate financing option provided by the financial institution can guarantee that the loan will be funded (assuming the borrower is willing to accept the terms of the financial institution) and establishes a ceiling on the "zone of possible agreement." Other benefits of immediate financing embodiments, i.e., prior to a loan auction, and gap filling loan embodiments, i.e., after a loan auction, especially in combination when the borrower is effectively prequalified for the gap filling loan, include an increase in loan closings and an increase in the availability of a blended rate for the borrower. A blended interest rate may or may not exceed the desired rate or a maximum rate of the P2P loan request, as understood by those skilled in the art. The availability of insurance products can reduce lender risk, improve the comfort level of a lender with respect to repayment, and provide assurance to a lender, resulting in a greater willingness to enter into loans, as understood by those skilled in the art.

According to other embodiment of the present invention, the financial institution can be a federally-chartered bank subject to federal banking laws and regulations and not subject to state banking laws and regulations. Therefore, the federally-chartered financial institution enjoys rate preemption; that is, state licensing requirements, as well as regulations in many states that limit lending interest rates, are preempted and do not apply to the federally-chartered financial institution. As understood by those skilled in the art, a federally-chartered financial institution can operate in every state with a consistent implementation nationally rather than a state-by-state approach and can charge any rate for the gap filling loans or immediate financing loans without regard to state law.

Embodiments of the present invention include additional features, As will be understood by those skilled in the art, the financial institution, for example, can employ various levels of sophisticated underwriting models and preselected authorization parameters to determine whether to authorize a gap filling loan, a financial institutional loan for the entire selected loan value, and one or more insurance products to guarantee the loan, according to embodiments of the present invention, so that loan request data is converted into loan offer data. Based on information from the credit reporting agencies that individual lenders on the P2P site would not otherwise have access to or the sophistication to develop, such models, for example, may include a behavior score that considers the borrower's credit score, length of employment, the presence of recent derogatory credit information such as bankruptcy, ability to provide direct deposits to the financial institution, or direct deposit history.

In addition, the financial institution can load the loan value to a prepaid card according to embodiments of the present invention to thereby convert the loan request into a prepaid card having an associated value and being capable of purchasing goods, so that the P2P lending marketplace is not limited to individual consumers with traditional bank accounts, checking accounts, and other such accounts as understood by those skilled in the arts, but expanded to include those using prepaid cards who otherwise may have difficulty in accessing the P2P lending marketplace. Loading the loan value on a prepaid card includes, for example, electronically interfacing with a prepaid card processor, such as, but not limited to FDR, FSV, Galileo, Symmetrex, and TSYS, associated with the prepaid card, as understood by those skilled in the art.

Embodiments of the present invention provide other benefits to the P2P lending website. An association with the financial institution can legitimize the P2P lending website, as understood by those skilled in the arts. The addition of gap filling loans, according to the embodiments of the present invention, allows the P2P lending website to preserve its social feel with the financial institution serving simply as a backstop for both individual consumer borrowers and lenders. Also, reporting the financial institution performance, as understood by those skilled in the art, for example, can create a "Beat the Stuffy, White Shirt Banker" promotional opportunity for the P2P lending website.

Figure 3:
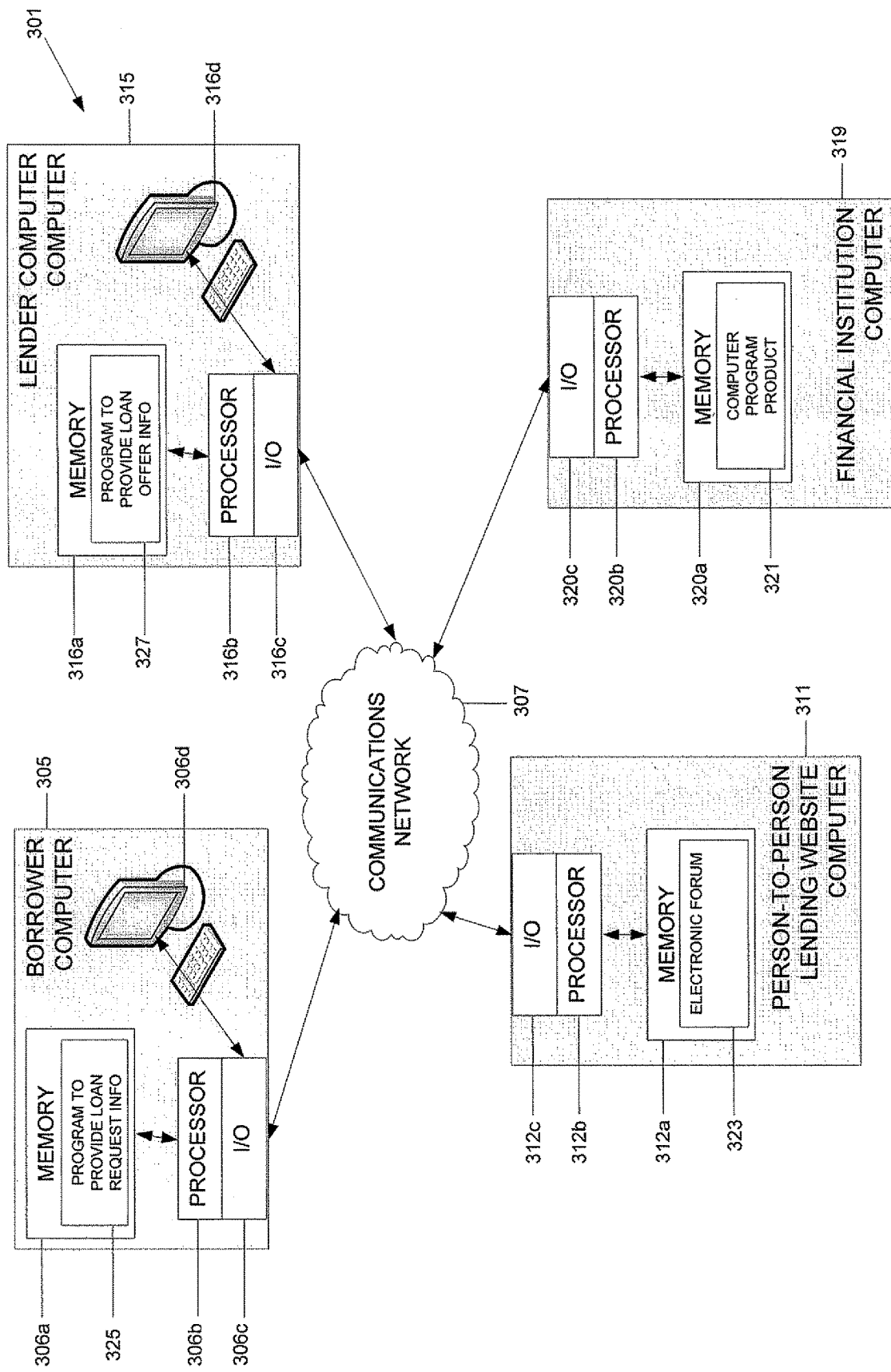
FIG. 3 is a system to finance an individual consumer loan request according to an embodiment of the present invention.
Figure 4:
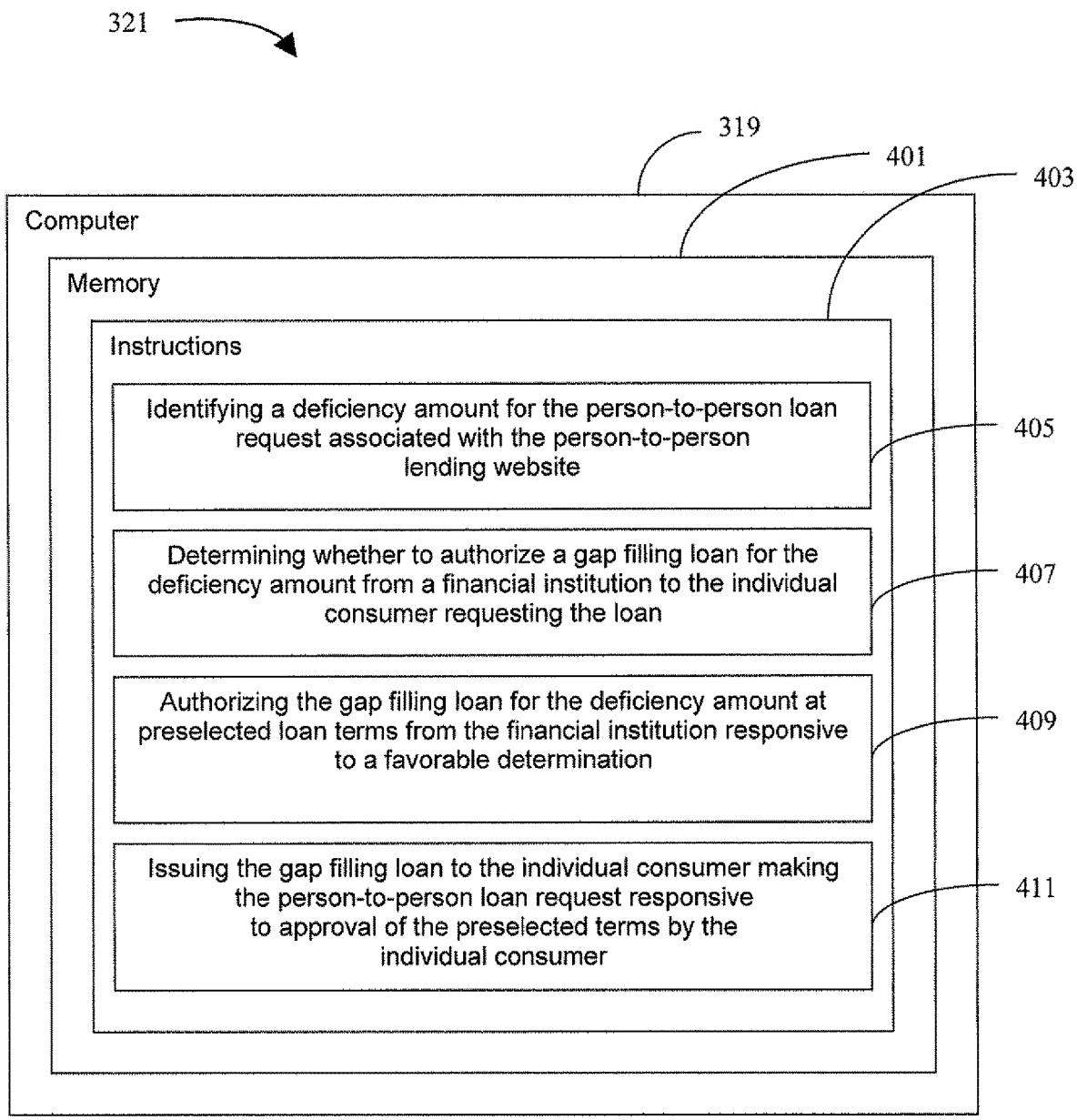
FIG. 4 is a partial schematic diagram of a computer program product for financing a deficiency amount for a P2P loan request according to an embodiment of the present invention.

FIGS. 3 and 4 illustrate embodiments of the present invention, which advantageously provide a system 301 to finance an individual consumer loan request associated with a P2P lending website 323. The system 301 includes a first computer associated with an individual consumer borrower defining a borrower computer 305. The borrower computer 305 can have, for example, memory 306a, one or more processors 306b, input/output (I/O) devices 306c, and a display 306d. The borrower computer 305 can also include a program product, e.g., software, stored in memory 306a to provide information for a P2P loan request 325 through an electronic communications network 307, e.g., the Internet or world wide web, to a second computer associated with a P2P lending website 323 defining a P2P lending website computer 311. The P2P lending website computer 311 can have, for example, memory 312a, one or more processors 31 2b, and input/output (I/O) devices 312c. The P2P lending website computer 311 has an electronic forum 323 for hosting a P2P loan request and for loan offers by one or more individual consumer lenders. The loan request information includes a preselected loan value. Each loan offer associated with the electronic forum 323 is responsive to the P2P loan request and has a loan value that fulfills all or a portion of the P2P the preselected loan value. The system 301 further includes one or more third computers associated with individual consumer lenders defining a lender computer 315. The lender computer 315 can have, for example, memory 316a, one or more processors 316b, input/output (I/O) devices 316c, and a display 316d. The lender computer 315 includes a program product stored in memory 316a to provide loan offer information 327 responsive to the P2P loan request to the P2P lending website computer 311 through the electronic communications network 307. That is, an individual consumer borrower can use, for example, a browser or other application program 325 running on a computer 305 to access a P2P lending website computer 311; the borrower computer 305 can provide loan request information, as understood by those skilled in the art. Then individual consumer lenders can use, for example, browsers or other application programs 327 running on computers 315 to access the P2P lending website computer 311; the lenders can make offers responsive to the P2P loan request, as understood by those skilled in the art. And the computers all communicate through the Internet, World Wide Web, or other such electronic communications network 307. The system 301 also, for example, can include a fourth computer associated with a financial institution defining a financial institution computer 319. The financial institution computer 319 can have, for example, memory 320a, one or more processors 320b, and input/output (I/O) devices 320c. The financial institution computer 319 receives loan information from the P2P lending website computer 311 through the electronic communications network 307.

As also illustrated in FIG. 4, the financial institution computer 319 includes a computer program product 321 associated with the financial institution computer 319, stored on a tangible computer memory media 401, operable on a computer, and used to finance an individual consumer loan request. The computer program product 421, for example, includes a set of instructions 403 that, when executed by the computer 419, cause the computer 419 to perform various operations. The operations include identifying a deficiency amount for the P2P loan request associated with the P2P lending website (block 405). The deficiency amount is the difference between the preselected loan value of the P2P loan request and a value of an aggregate of any individual consumer loan offers responsive to the P2P loan request, if the value of the aggregate is less than the preselected loan value. The operations also include determining whether to authorize a gap filling loan for the deficiency amount from a financial institution to an individual consumer requesting the loan (block 407) and authorizing the gap filling loan for the deficiency amount at preselected loan terms from the financial institution (block 409). The operations further include issuing the gap filling loan to the individual consumer making the P2P loan request responsive to approval of the preselected terms by the individual consumer (block 411).

Figure 5:
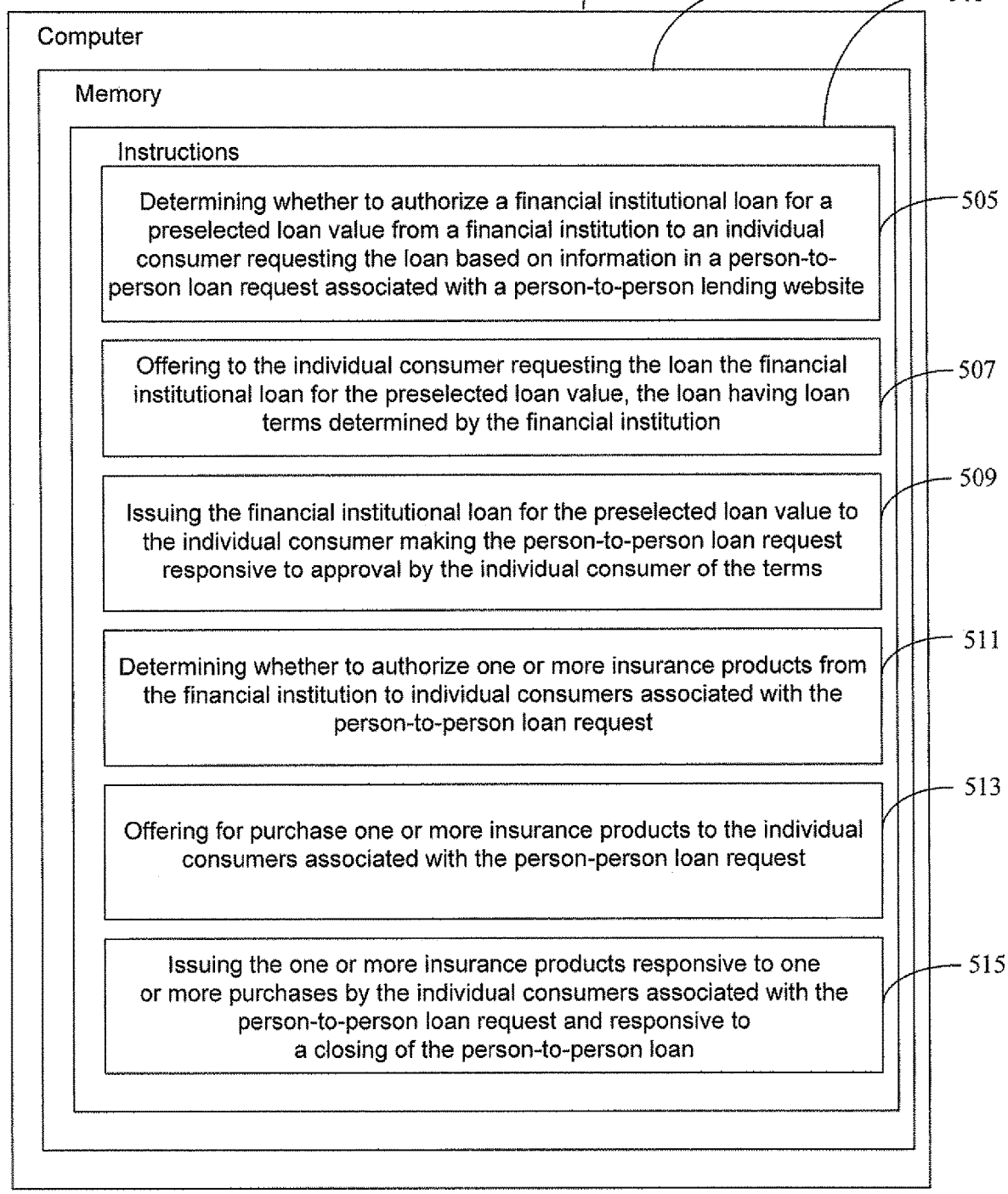
FIG. 5 is a partial schematic diagram of a computer program product of satisfying a P2P loan request according to another embodiment of the present invention.

FIG. 5 illustrates another embodiment of a program product of the present invention, which includes a computer program product 321 associated with a financial institution computer 319, stored on a tangible computer memory media 501, operable on a computer, and used to finance an individual consumer loan request. The computer program product 321, for example, includes a set of instructions 503 that, when executed by the computer 319, cause the computer 319 to perform various operations. The operations include determining whether to authorize a financial institutional loan for a preselected loan value from a financial institution to an individual consumer requesting the loan based on information in a P2P loan request (block 505). The operations also include offering to the individual consumer requesting the loan the financial institutional loan for the preselected loan value with loan terms determined by the financial institution based on the information in the P2P loan request (block 507) so that the individual consumer requesting the loan can choose an immediate loan offer with terms determined by the financial institution or choose to solicit individual consumer loan offers with more favorable terms through the P2P lending website. The operations further include issuing the financial institutional loan for the preselected loan value to the individual consumer making the P2P loan request responsive to approval by the individual consumer of the terms from the financial institution (block 509). In addition, the operations include determining whether to authorize one or more insurance products from the financial institution to individual consumers associated with the P2P loan request (block 511). The operations further include offering for purchase one or more insurance products, such as, for example, debt cancellation insurance and credit life insurance (block 513). The operations also include issuing one or more insurance products responsive to one or more purchases by the individual consumers associated with the P2P loan request and responsive to a closing of the loan (block 515).

A person having ordinary skill in the art will recognize that various types of memory are readable by a computer such as described herein, e.g., underwriter computer, bank computer, prepaid card processors, or other computers with embodiments of the present invention. Examples of computer readable media include but are not limited to: non-volatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the locations described to store program products, e.g., including software, thereon.

Figure 6:
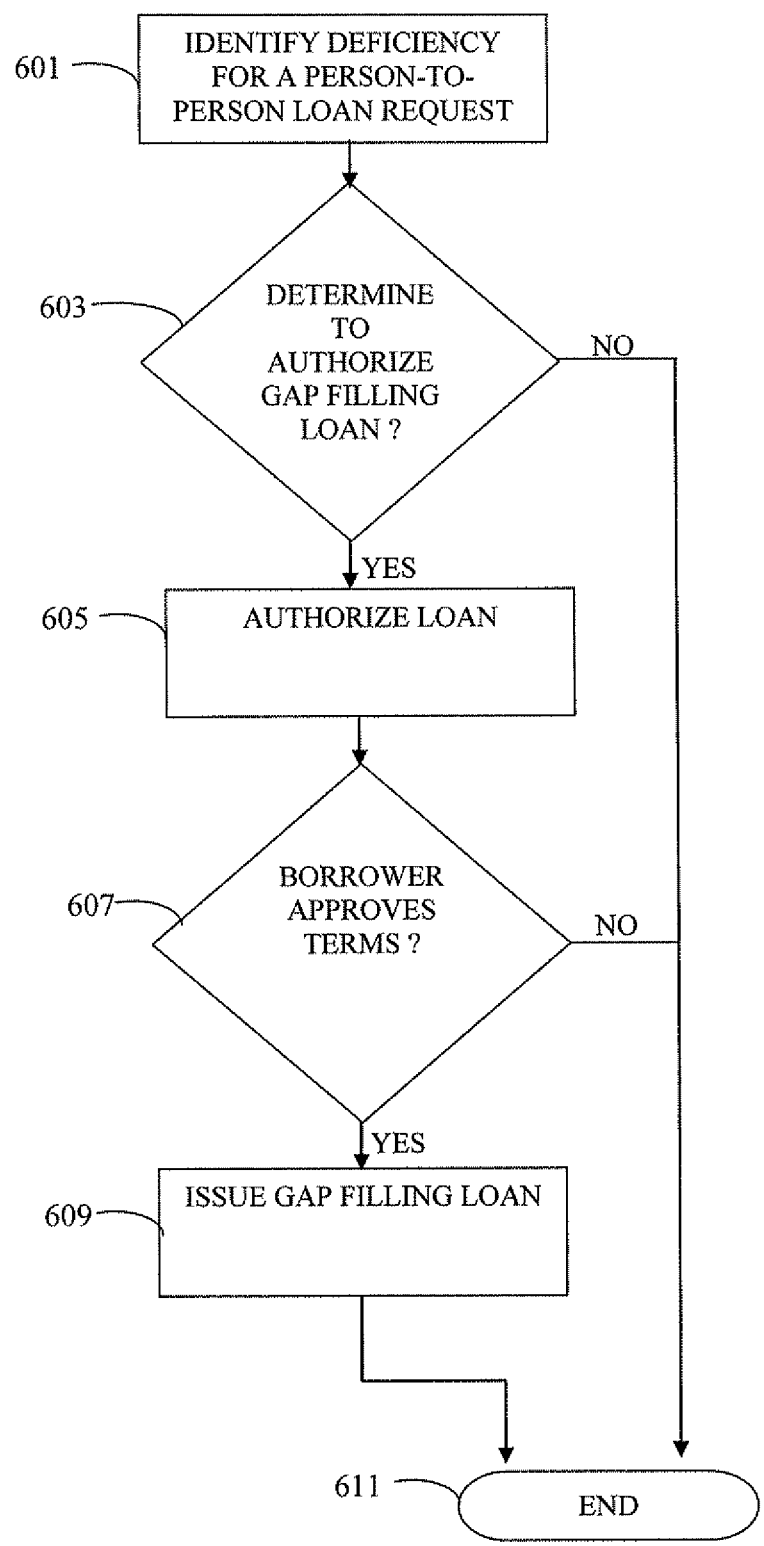
FIG. 6 is a flowchart of a process of issuing a gap filling loan from a financial institution according to an embodiment of the present invention.

FIG. 6 illustrates an embodiment of the present invention, which includes a process of issuing a gap filling loan from a financial institution, for example. The process includes identifying a deficiency amount for a loan request associated with a P2P lending website (step 601). Next, the decision flow of the process involves determining whether to authorize a gap filling loan for the deficiency amount (block 603). If the determination is not to authorize, the process ends (block 611). If the determination is to authorize, then the financial institution authorizes the gap filling loan (block 605). Next, the decision flow of the process involves asking if the borrower approves the terms from the financial institution (block 607). If the borrower does not, then the process ends (block 611). If the borrower does approve the terms, then the financial institution issues the gap filling loan (block 609). And the process ends (block 611).

FIG. 7 illustrates another embodiment of the present invention, which includes a process of issuing a loan or insurance product from a financial institution responsive to a P2P loan request, for example. The process includes receiving information in person-person loan request associated with a P2P lending website (step 701). Next, the decision flow of the process involves determining whether to authorize an immediate financing loan from the financial institution (block 703). If the determination is to authorize, then the financial institution offers the immediate financing loan with terms determined by the financial institution (block 705). Next, the decision flow of the process involves asking if the borrower approves the terms from the financial institution (block 707). If the borrower approves the terms, then the financial institution issues the loan (block 709) and the process ends (block 721). If, however the determination is not to authorize the loan or the borrower does not approve terms, then the process continues with determining whether to offer loan insurance products (block 711). If the determination is not to offer the loan insurance products, the process ends (block 721). If the determination is to offer the loan insurance products, then the financial institution offers the loan insurance products (block 713). Next, the decision flow of the process involves asking if the insurance product is purchased (block 715). If the insurance product purchase is declined, then the process ends (block 721). If the insurance product is purchased, then the decision flow of the process involves asking if the loan closed (block 717). If the loan does not close, then the process ends (block 721). If the loan does close, then the financial institution issues the insurance product (block 719). And the process ends (block 721).

Figure 8A:
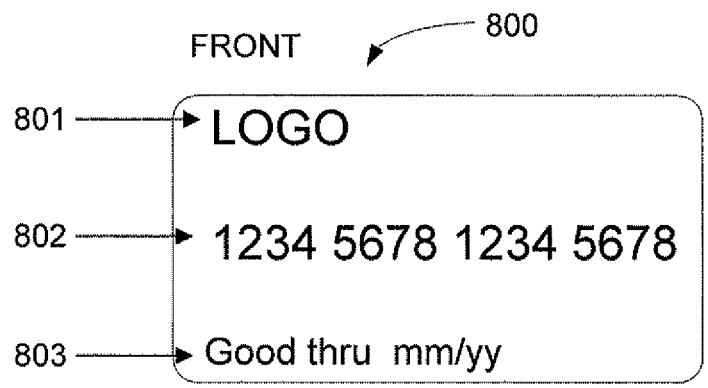
FIGS. 8A and 8B are respective front and rear views of a prepaid card according to embodiments of the present invention.
Figure 8B:
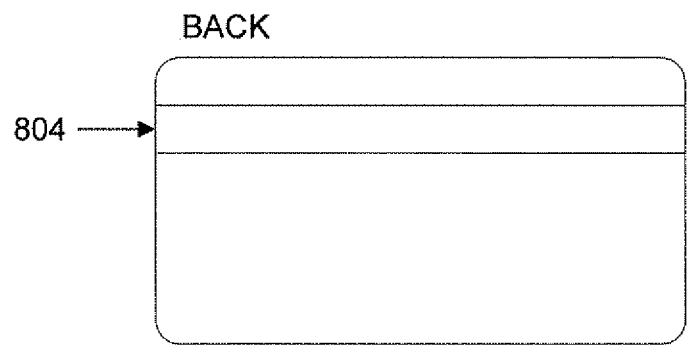
Figure 9:
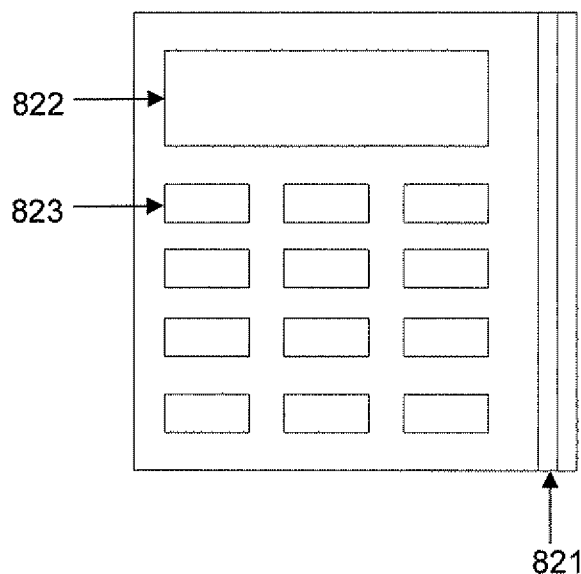
FIG. 9 is a schematic block diagram of a point-of-sale hardware device according to an embodiment of the present invention.

FIGS. 8A and 8B illustrate a prepaid card 800, according to an embodiment of the present invention. FIGS. 9 illustrates a point-of-sale hardware device 820, e.g., a card reader, according to an embodiment of the present invention. As understood by those skilled in the art, the prepaid card can have indicia 801, e.g., logos, slogans, source identifiers, of a sponsoring bank and of a prepaid card processor; a serial number 802, e.g., an account number; and expiration date 803. The structures of various types of specific cards, e.g., magnetic stripe 804, type of material, are well known to those skilled in the art and can be used with embodiments of the present invention. Typically, a card 800 is formed from plastic and has a magnetic stripe 804 affixed to the plastic through an application of heat, Those skilled in the art will understand that other embodiments besides a magnetic stripe can include radio frequency identification devices (RFID), smart chips, bar codes, and other similar devices. Embodiments of the present invention can include forming cards or receiving cards already formed. A magnetic stripe card 800 can store information, or data, e.g., account information, by modifying the magnetism of particles on the magnetic stripe 804 on the card. The information can be read by swiping the card with a point-of-sale hardware device 820. The point-of-sale hardware device 820 can include, for example, interface buttons 823 for use by the merchant personnel or the consumer, a display 822 for providing feedback, and a slot 821 for swiping the card to engage the magnetic stripe 804 on the card with the reader as understood by those skilled in the art. Typically, there are two tracks of information on a magnetic card used for financial transactions, known as tracks 1 and 2. In addition, a third track, known as track 3, can be available for magnetic stripe cards. Tracks 1 and 3, if available, are typically recorded at 210 bits per inch, while track 2 typically has a recording density of 75 bits per inch. Track 2, as typically encoded, was developed by the American Bankers Association (ABA) provides for 37 numeric data characters, including up to 19 digits for a primary account number (including a Bank Identification Number as understood by those skilled in the art), an expiration date, a service code, and discretionary verification data, such as, a Personal Identification Number, or PIN. The information on the card can be used, for example, to facilitate a transaction. For example, when the prepaid card 800 is swiped through a point-of-sale device 820, the information on the magnetic stripe 804 is read and processed by the reader allowing a value associated with the prepaid card to be used to purchase goods and services. In addition, the point-of-sale hardware device 820, through its display 822, can represent a visual depiction of the financial institution loan value loaded onto the prepaid card 800.

Advantageously, embodiments of the present invention, for example, can transform data associated with an individual consumer requesting a loan into an offer for a financial institution loan then into data representing a loan and accordingly into data associated with a value on a prepaid card, resulting in the consumer being able to, for example, perform a home improvement project, take a vacation, enroll in school, or other such purpose provided in the loan request data. That is, the loan request data can be transformed into a new garage or replacement windows according to embodiments of the present invention.

Embodiments of the present invention provide additional benefits for the financial institution, for example, including a low cost customer acquisition channel and cross marketing opportunities for other products and services, As understood by those skilled in the arts, the financial institution can purchase receivables from the individual consumer lenders, forming a secondary market and providing individual consumer lenders the ability to access cash tied up in loans. Additionally, the financial institution can share its sophisticated underwriting models and preselected authorization parameters with individual consumer lenders wanting to piggyback on the financial institution's credit standards according to embodiments of the present invention, further legitimizing the P2P lending website and the underwriting and performance data reported by the P2P lending website, as understood by those skilled in the arts.

This application claims priority to and the benefit of U.S. Provisional Patent Application No. 61/033,069, titled "Person-to-Person Lending Program Product, System, and Associated Methods", filed on Mar. 3, 2008, incorporated herein by reference in its entirety.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

The invention claimed is:

1. A non-transitory computer-readable storage medium having an executable program stored thereon, used to finance a person-to-person loan request associated with an electronic forum for person-to-person loans, the program adapted to instruct a processor associated with a financial institution computer to perform the operations of:

receiving information in a person-to-person loan request associated with an electronic forum for person-to-person loans, the person-to-person loan request being from an individual consumer and having a preselected loan value, the electronic forum defining a person-to-person lending website accessible by a browser used by the individual consumer;

offering to the individual consumer a first loan from a financial institution for the preselected loan value prior to the individual consumer soliciting individual consumer loan offers responsive to the person-to-person loan request via the person-to-person lending website and the person-to-person loan request being posted on the person-to-person lending website such that the individual consumer can choose the first loan from the financial institution before the person-to-person loan request is posted on the person-to-person lending website and can choose to solicit individual consumer loan offers responsive to the person-to-person loan request via the person-to-person lending website instead of accepting the first loan, wherein the offering of the first loan establishes a zone of possible agreement with respect to the first loan;

determining, responsive to the individual consumer choosing to solicit individual consumer loan offers responsive to the person-to-person loan request via the person-to-person lending website instead of accepting the first loan, to authorize a second loan from the financial institution to define a financial institution loan to the individual consumer responsive to the information in the person-to-person loan request;

offering, in an interface in the browser used by the individual consumer, the financial institution loan to the individual consumer to create a financial institution loan offer, the financial institution loan offer having loan terms determined by the financial institution responsive to the information in the person-to-person loan request, wherein offering to the individual consumer the financial institution loan comprises:

identifying a deficiency amount for the person-to-person loan request associated with the person-to-person lending website, the deficiency amount being the difference between the preselected loan value of the person-to-person loan request and a value of an aggregate of any individual consumer loan offers responsive to the person-to-person loan request and associated with the person-to-person lending website, the value of the aggregate being less than the preselected loan value; and offering to the individual consumer a gap filling loan from the financial institution for the deficiency amount such that the gap filling loan comprises the financial institution loan, the gap filling loan offer having loan terms determined by the financial institution responsive to the information in the person-to-person loan request so that the person-to-person loan request can be partially satisfied by individual consumer loan offers; and issuing the financial institution loan to the individual consumer responsive to approval by the individual consumer of the loan terms from the financial institution so that the person-to-person loan request is converted into proceeds from the financial institution loan, wherein the operation of issuing the financial institution loan to the individual consumer includes loading, by electronically interfacing with a prepaid card processor, the preselected loan value to a prepaid card to thereby convert the person-to-person loan request into a prepaid card having an associated value and being capable of purchasing goods, wherein loading comprises encoding, by the prepaid card processor, a track of information with a primary account number, an expiration date, a service code, and discretionary verification data.

2. A non-transitory computer-readable storage medium of claim 1, wherein the operations further:

determining whether to authorize one or more insurance products from the financial institution to the individual consumer associated with the person-to-person loan request;

offering for purchase one or more insurance products to the individual consumer associated with the person-to-person loan request, the one or more insurance products including one or more of the following: debt cancellation insurance and credit life insurance; and issuing the one or more insurance products responsive to one or more purchases by the individual consumer associated with the person-to-person loan request and responsive to a closing of the loan.

3. A non-transitory computer-readable storage medium of claim 1, wherein the person-to-person lending website solicits person-to-person loan requests having a maximum interest rate and responsively solicits loan offers having an interest rate, the loan offer interest rate being less than or equal to the loan request maximum interest rate so that prospective individual consumers are enabled to compete to fulfill the person-to-person loan request; wherein determining to authorize the financial institution loan from the financial institution to the individual consumer responsive to information in the person-to-person loan request includes one or more preselected authorization parameters being related to a loan underwriting model; and wherein the financial institution is a federally-chartered bank subject to federal banking laws and regulations and not subject to state banking laws and regulations.

4. A non-transitory computer readable storage medium of claim 1, wherein the operations further include:

determining whether to authorize one or more insurance products from the financial institution to one or more individual consumers who have made individual consumer loan offers through the person-to-person lending website responsive to the person-to-person loan request thereby to define individual offering consumers associated with the person-to-person loan request;

offering for purchase one or more insurance products to the individual offering consumers associated with the person-to-person loan request, the one or more insurance products including one or more of the following: debt cancellation insurance and credit life insurance; and issuing the one or more insurance products responsive to one or more purchases by the individual offering consumers associated with the person-to-person loan request and responsive to a closing of the loan.

5. A computer-implemented method of satisfying a person-to-person loan request, the computer-implemented method comprising:

receiving information in a person-to-person loan request from an electronic forum for person-to-person loans by a computer associated with a financial institution defining a financial institution computer, the loan request being from an individual consumer and having a preselected loan value, the electronic forum defining a person-to-person lending website accessible by a browser used by the individual consumer;

offering to the individual consumer a first loan from a financial institution for the preselected loan value prior to the individual consumer soliciting individual consumer loan offers responsive to the person-to-person loan request and the person-to-person loan request being posted on the person-to-person lending website such that the individual consumer can choose the first loan from the financial institution before the person-to-person loan request is posted on the person-to-person lending website and can choose to solicit individual consumer loan offers responsive to the person-to-person loan request via the person-to-person lending website instead of accepting the first loan, wherein the offering of the first loan establishes a zone of possible agreement with respect to the first loan;

determining, responsive to the individual consumer choosing to solicit individual consumer loan offers responsive to the person-to-person loan request via the person-to-person lending website instead of accepting the first loan, to authorize a second loan from the financial institution to define a financial institution loan to the individual consumer responsive to the information in the person-to-person loan request;

offering, in an interface in the browser used by the individual consumer, the financial institution loan to the individual consumer to create a financial institution loan offer, the financial institution loan offer having loan terms determined by the financial institution responsive to the information in the person-to-person loan request, wherein offering to the individual consumer the financial institution loan comprises:

identifying a deficiency amount for the person-to-person loan request associated with the person-to-person lending website, the deficiency amount being the difference between the preselected loan value of the person-to-person loan request and a value of an aggregate of any individual consumer loan offers responsive to the person-to-person loan request and associated with the person-to-person lending website, the value of the aggregate being less than the preselected loan value; and offering to the individual consumer a gap filling loan from the financial institution for the deficiency amount such that the gap filling loan comprises the financial institution loan, the gap filling loan offer having loan terms determined by the financial institution responsive to the information in the person-to-person loan request so that the person-to-person loan request can be partially satisfied by individual consumer loan offers; and issuing the financial institution loan to the individual consumer responsive to approval by the individual consumer of the loan terms from the financial institution so that the person-to-person loan request is converted into proceeds from the financial institution loan, wherein the operation of issuing the financial institution loan to the individual consumer includes loading, by electronically interfacing with a prepaid card processor, the preselected loan value to a prepaid card to thereby convert the person-to-person loan request into a prepaid card having an associated value and being capable of purchasing goods, wherein loading comprises encoding, by the prepaid card processor, a track of information with a primary account number, an expiration date, a service code, and discretionary verification data.

6. A computer-implemented method of claim 5, wherein the method further comprises:

determining whether to authorize one or more insurance products from the financial institution to the individual consumer associated with the person-to-person loan request;

offering for purchase one or more insurance products to the individual consumer associated with the person-to-person loan request, the one or more insurance products including debt cancellation insurance; and issuing the one or more insurance products responsive to one or more purchases by the individual consumer associated with the person-to-person loan request and responsive to a closing of the loan.

7. A computer-implemented method of claim 5, wherein the method further comprises:

determining whether to authorize one or more insurance products from the financial institution to the individual consumer associated with the person-to-person loan request;

offering for purchase one or more insurance products to the individual consumer associated with the person-to-person loan request, the one or more insurance products including credit life insurance; and issuing the one or more insurance products responsive to one or more purchases by the individual consumer associated with the person-to-person loan request and responsive to a closing of the loan.

8. A computer-implemented method of claim 5, wherein the method further comprises reading data on the prepaid card to access the preselected loan value on the prepaid card to represent a visual depiction of the preselected loan value on a display associated with the reader and to complete a transaction of goods to thereby convert the data on the prepaid card into goods.

9. A computer-implemented method of claim 5, wherein the person-to-person lending website solicits person-to-person loan requests having a maximum interest rate and responsively solicits loan offers having an interest rate, the loan offer interest rate being less than or equal to the loan request maximum interest rate so that prospective individual consumers are enabled to compete to fulfill the person-to-person loan request; wherein determining whether to authorize the financial institution loan from the financial institution to the individual consumer responsive to information in the person-to-person loan request includes one or more preselected authorization parameters being related to a loan underwriting model so that loan request data is converted into loan offer data; and wherein the financial institution is a federally-chartered bank subject to federal banking laws and regulations and not subject to state banking laws and regulations.

10. A computer-implemented method of claim 5, wherein the method further comprises:

determining whether to authorize one or more insurance products from the financial institution to one or more individual consumers who have made individual consumer loan offers through the person-to-person lending website responsive to the person-to-person loan request thereby to define individual offering consumers associated with the person-to-person loan request;

offering for purchase one or more insurance products to the individual offering consumers associated with the person-to-person loan request, the one or more insurance products including debt cancellation insurance; and issuing the one or more insurance products responsive to one or more purchases by the individual offering consumers associated with the person-to-person loan request and responsive to a closing of the loan.

11. A computer-implemented method of claim 5, wherein the method further comprises:

determining whether to authorize one or more insurance products from the financial institution to one or more individual consumers who have made individual consumer loan offers through the person-to-person lending website responsive to the person-to-person loan request thereby to define individual offering consumers associated with the person-to-person loan request;

offering for purchase one or more insurance products to the individual offering consumers associated with the person-to-person loan request, the one or more insurance products including credit life insurance; and issuing the one or more insurance products responsive to one or more purchases by the individual offering consumers associated with the person-to-person loan request and responsive to a closing of the loan.

* * * * *